US012194517B2

(12) United States Patent
Boegli et al.

(10) Patent No.: US 12,194,517 B2
(45) **Date of Patent: *Jan. 14, 2025**

(54) METHOD AND DEVICE FOR EMBOSSING RELIEF STRUCTURES

(71) Applicant: Boegli-Gravures SA, Marin-Epagnier (CH)

(72) Inventors: Charles Boegli, Marin-Epagnier (CH); Alain Droz, Marin-Epagnier (CH); Felix Lustenberger, Marin-Epagnier (CH)

(73) Assignee: BOEGLI-GRAVURES SA, Marin-Epagnier (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/365,283

(22) Filed: Aug. 4, 2023

(65) Prior Publication Data

US 2023/0381843 A1 Nov. 30, 2023

Related U.S. Application Data

(63) Continuation of application No. 17/252,300, filed as application No. PCT/IB2018/054699 on Jun. 26, 2018, now Pat. No. 11,819,894.

(51) Int. Cl.

| | |
|---|---|
| ***B21B 1/40*** | (2006.01) |
| ***B31F 1/07*** | (2006.01) |
| ***B44B 5/00*** | (2006.01) |

(52) U.S. Cl.

CPC .................. *B21B 1/40* (2013.01); *B31F 1/07* (2013.01); *B44B 5/0009* (2013.01); (Continued)

(58) Field of Classification Search

CPC ...... B21B 1/40; B41F 1/07; B41F 2201/0733; B41F 2201/0738; B44B 5/0009; (Continued)

(56) References Cited

U.S. PATENT DOCUMENTS 3,673,839 A 7/1972 Nielsen et al.
5,007,271 A 4/1991 Boegli
(Continued)

FOREIGN PATENT DOCUMENTS

AU 772613 B2 5/2004
CA 2382597 A1 11/2000
(Continued)

OTHER PUBLICATIONS

Office Action issued in Indian Patent Application No. 202017054847 dated Jul. 12, 2022.
(Continued)

*Primary Examiner* — David H Banh
(74) *Attorney, Agent, or Firm* — NIXON & VANDERHYE

(57) ABSTRACT

A method and device of embossing individually light-reflecting areas on a foil material, the method and device comprising feeding a foil material into a roller nip between a pair of rollers, wherein the pair of rollers comprises a first roller and a second roller, providing each of the first roller and second roller at their respective surfaces at least in a determined perimeter, respectively with a plurality of polyhedron-shaped positive projections and a plurality of negative projections complementary to the positive projections, whereby the plurality of positive projections are arranged according to a 2-dimensional grid. The plurality of polyhedron-shaped positive projections seamlessly and gaplessly join with those corresponding negative projections at the intended embossing of the foil material, hence enabling a homogeneously jointed embossed polyhedron-like shape in the foil. The method and device further comprise, for the purpose of providing a plurality of light-reflecting areas on the foil material, that are intended to reflect light in line with a table of reflectivity values for the 2-dimensional grid,
(Continued)

according to an orientation and shape of each of the plurality of light-reflecting areas, and enabling a perception by the human eye of a user, of the intended reflected light on a determined wide viewing angle covered by reflected light from any of the light-reflecting areas, a step of adjusting for each of the plurality of light-reflecting areas to be provided, an orientation and shape of the corresponding positive projection in the 2-dimensional grid, that is intended to emboss the light-reflecting area.

17 Claims, 22 Drawing Sheets

(52) U.S. Cl.
CPC .... *B44B 5/0047* (2013.01); *B31F 2201/0733* (2013.01); *B31F 2201/0738* (2013.01)

(58) Field of Classification Search
CPC .. B44B 5/0047; B31F 1/07; B31F 2201/0733; B31F 2201/0738
See application file for complete search history.

(56) References Cited

U.S. PATENT DOCUMENTS 5,598,774 A 2/1997 Boegli
6,080,276 A 6/2000 Burgess
6,176,819 B1 1/2001 Boegli et al.
6,302,998 B1 * 10/2001 Burgess .................... B31F 1/07 162/113
6,665,998 B1 12/2003 Boegli
6,715,411 B1 4/2004 Boegli
7,036,347 B2 5/2006 Boegli
7,147,453 B2 12/2006 Boegli
7,229,681 B2 6/2007 Boegli
7,971,526 B2 * 7/2011 Blenke ...................... B31F 1/07 411/404
8,038,922 B2 10/2011 Boegli
8,430,663 B2 4/2013 Boegli
8,495,900 B2 7/2013 Boegli
8,932,044 B2 1/2015 Boegli
9,140,834 B2 9/2015 Boegli
9,156,107 B2 10/2015 Boegli et al.
9,180,643 B2 11/2015 Boegli
9,481,141 B2 11/2016 Boegli
9,505,167 B2 11/2016 Boegli
9,579,924 B2 2/2017 Boegli
9,636,885 B2 5/2017 Boegli et al.
9,809,927 B2 11/2017 Boegli
9,939,725 B2 4/2018 Boegli et al.
9,993,895 B2 6/2018 Boegli et al.
10,083,253 B2 9/2018 Boegli et al.
10,183,318 B2 1/2019 Boegli et al.
11,819,894 B2 * 11/2023 Boegli .................. B44B 5/0047
2005/0279147 A1 * 12/2005 Boegli .................... B29C 59/04 72/196
2008/0292885 A1 11/2008 Dohring
2010/0061619 A1 3/2010 Boegli
2012/0018993 A1 1/2012 Boegli et al.
2012/0292821 A1 11/2012 Boegli
2014/0059977 A1 3/2014 Boegli
2015/0059599 A1 * 3/2015 Boegli ...................... B30B 3/04 101/23
2016/0075077 A1 3/2016 Boegli et al.
2016/0193868 A1 * 7/2016 Espe ......................... B44F 9/00 216/9
2016/0200066 A1 * 7/2016 Boegli .................... B44B 5/026 101/28
2017/0066079 A1 3/2017 Reisse et al.
2017/0282635 A1 10/2017 Boegli et al.
2018/0220698 A1 8/2018 Boegli et al.
2018/0370175 A1 12/2018 Boegli et al.
2020/0324505 A1 10/2020 Boegli et al.

FOREIGN PATENT DOCUMENTS

CA 2367423 C 5/2008
DE 202017105458 U1 10/2017
EP 1324877 B1 6/2006
EP 0925911 B2 11/2006
EP 2572820 A1 3/2013
EP 2653301 A1 10/2013
EP 3300612 A1 4/2018
EP 3415306 A1 12/2018
WO 2007/012215 A1 2/2007
WO 2015/028939 A1 3/2015
WO 2017/108516 A1 6/2017
WO 2018/229557 A1 12/2018

OTHER PUBLICATIONS

International Search Report dated Mar. 7, 2019 for Application No. PCT/IB2018/054699.
Written Opinion of the ISA dated Mar. 7, 2019 for Application No. PCT/IB2018/054699.
David Salomon, "The Computer Graphics Manual", Springer, 2011 Edition, ISBN-13: 978-0857298850, 1 page of concise description.

* cited by examiner

METHOD AND DEVICE FOR EMBOSSING RELIEF STRUCTURES

CROSS-REFERENCE TO RELATED APPLICATIONS

This application is a continuation application of U.S. patent application Ser. No. 17/252,300 filed on Dec. 15, 2020, which is the U.S. national phase of International Application No. PCT/162018/054699 filed on Jun. 26, 2018, which designated the United States, the entire contents of each of which are hereby incorporated herein by reference.

FIELD OF INVENTION

The invention is in the field of foil material embossing by means of cooperating rollers that comprise structured surfaces.

BACKGROUND OF THE INVENTION

The present invention relates to a method and apparatus for the relief embossing of packaging films such as those used in the tobacco and food industry, for chocolate, butter or similar foods. The so-called inner liners originally consisted of integral aluminum foils, which were passed between two rolls for embossing (see, for example, WO2017/108516).

In parallel with the development of embossing technology and the improved quality and lifetime of the embossing rollers, a change from integral aluminum foils to paper films that were thinner and metal-film coated was implemented for environmental reasons.

At the same time, there was an increased demand around the year 2000 for attractive technical means to achieve intensified advertising on inner liners.

A known embossing-roller system, such as a pin-up/pin-up system 100 in FIG. 1—patented by the same inventor in EP0925911B2—comprises two embossing rolls 101 and 102 that are mutually movably arranged such that a self-stabilizing effect occurs when the embossing rolls 101 and 102 intermesh. In a preferred embodiment of the roller system, the rollers have a relative axial clearance of at least one-half to three-quarter tooth pitch (not shown in FIG. 1). With these and other measures, otherwise non-compensable unbalance and natural manufacturing tolerances of the roll production by means of milling can be compensated.

From the top view shown FIG. 2*a*, which is taken from publication EP0925911 B2, it may be seen between four teeth 200-203 of a roller (roller not shown in FIG. 2*a*) one tooth 204 from a counter roller (counter roller not shown in FIG. 2*a*) positioned in midst of teeth 200 and 202. The one tooth 204 is shown in transparency using dotted lines. This situation occurs when the roller and the counter roller are rolling against each other for embossing, and is known also under the name pin-up/pin-up embossing method. For a better reading of FIG. 2A, only one tooth 204 of the counter roller is shown, but further teeth of the counter roller are also positioned in a similar manner. FIG. 2*b* illustrates a stable running condition of the roller and the counter roller, whereby circles, e.g., circles 200, 201, 202 represent teeth from the roller, and triangles illustrate teeth from the counter roller, such as, e.g., tooth 204. A stable running condition means that there is virtually no slip between the roller and the counter roller. Another way of expressing the stable running condition is to say that this is a condition in which pyramids self-adjust and fall in place perfectly. In FIG. 2*b* this means that the tooth 204 of the counter roll is positioned substantially centrally between teeth of the roller, i.e., between teeth 200, 201 and 202 for example. It becomes readily apparent to those skilled in the art that in the case of a relatively large play in an axial direction 205, the teeth from the counter roller, e.g., tooth 204, may slip between teeth from the roller, e.g., tooth 204 from the counter roller is positioned in the middle of teeth 200 and 202 from the roller, as illustrated in FIG. 2*c*, hence resulting in an unstable running condition. As shown in FIG. 2*a*, marked edges 208 would then exert a pressure on a foil material to be embossed. Another way to express the unstable running condition is to say that the two rollers are not perfectly falling in place and the foil material during embossing may be pinched by the sidewalls of the pyramids. A slip in the axial direction 205 as shown in the FIG. 2*a* may be caused by a mechanical clearance 206—as shown in FIG. 2*a*—of at least one-half to three-quarter tooth pitch 207. An embossing of foil material with characters made of sets of teeth enables an optical read-out of the embossed characters with a stable contrast of the embossed characters (foil material, sets of teeth for characters, and embossed characters not shown in FIG. 2*a*). This may only be achieved if a high and constant pressure is exerted on the rolls and applied during the embossing process, resulting in a position of the teeth as shown in FIG. 2*b* (pressure and embossing process not illustrated in FIG. 2*b*). In this context, the term stable contrast means that a contrast level is not sensitive or only very weakly sensitive to processing conditions.

Following the prior art taught in EP0925911 B2, the same inventor patented in EP1324877 B1 a device for producing embossing effects, which allows embossing on packaging films of signs with location and/or light-source-dependent optical and aesthetic effects in reflected light, as well as security features that are comparatively difficult to copy. These embossing effects enable the designer to add optionally shades that are highly dependent on the viewing angle. However, the original aim of the approach taught by EP1324877 B1 was to produce a variable embossing effect that exhibits the same intensity ratios in the reflected light for the viewer independent of the viewing location and without constant adjustment of a roller pressure when embossing. This goal could not be achieved with the approach described in EP1324877 B1.

FIG. 3*a* and FIG. 3*b* show an operating principle of EP1324877 B1. FIG. 3A shows embossing rollers 300 and 301 positioned on opposite sides of a foil material 302 to be embossed. The roller 300 carries in its configuration of the teeth a design of a character to be embossed, while roller 301 is entirely covered by a regular pattern of pyramidal teeth. The embossing roller 300 and 301 are intended to be positioned such that the illustrated teeth intermingle perfectly, and the embossing rollers rotate around their respective illustrated rotation axis according to the circular arrows. FIG. 3*b* is based on EP1324877 B1 and shows the embossed material foil 302 that results from embossing with rollers 300 and 301 (see FIG. 3*a*), and more specifically at the location indicated by the circle 303 in FIG. 3*a*. Essentially, a size of a reflecting surface F shown in FIG. 3*b* is responsible for the desired effects on reflected light 304 from a light beam 305, in accordance with the description in the preceding paragraph. A pitch s, a total tooth height h—also named individual height—as well as possible height H of a tooth 306 during machining (machining not illustrated in FIG. 3*b*), different from the individual height, show the limits for the achievable truncated pyramidal shapes of the teeth and their possible truncation heights H. In addition, a flatness and an area size of the reflective surface F, i.e., the quality of the manufactured surface may only be controlled to a limited extent in the traditional machining environment.

If for example at least one side of foil material 302 is integral aluminum with specific material properties, then with an irradiation intensity of I°=1.0 of the impinging visible light 305, this aluminum foil surface exhibits a direct reflectance of approximately I'=0.9 per unit area. On the other hand, a metallized film obtained by vapor deposition of aluminum generally has a direct reflectance of only I"=0.8 per unit area. Practically, by skillful choice of truncation heights H of embossed truncated pyramidal shapes, four different discernible contrast levels may be achieved which is sufficient for security applications but is insufficient for aesthetic purposes.

The low level of light exploitation resulting from the use of the basic pin-up/pin-up embossing technique is an obstacle to the development of modern, brilliant embossing effects at high production speeds.

EP1324877 B1 represents a prior art that has been in use since about 2001, and which essentially changed only through the mastery of short pulse laser engraving. The further development of fine-embossing technology proved promising. The laser-based engraving technique has enabled for the first time pin-up/pin-down engraving of embossing rollers, e.g., in WO2015/028939 A1. WO2015/028939 A1 pointed the way to a high precision, easily reproducible production of complementary embossing rollers, which until at the time of filing of the international application was only possible with great effort. Reliefs were built using exaggerated elevation and pedestals in order to create optically pleasing brilliance in logos. However, this technique did not allow creating half-toning directly but only using some crude approximation.

OBJECT OF INVENTION

In order to account for the expected further development of the aesthetic aspects of embossing as well as the tendency of a very-low degree of metallization, the object of the present invention is to create brilliant, high-quality, and operationally easy-to-control on-line-embossing results in foil material such as traditional packaging materials and films such as metallic foils, metallized papers, polymer films or laminates. The strong dependency on the embossing pressure and the viewing angle in EP1324877 B1 must be greatly improved, if possible eliminated altogether.

SUMMARY OF INVENTION

In a first aspect, the invention provides a method of embossing individually light-reflecting areas on a foil material, the method comprising feeding a foil material into a roller nip between a pair of rollers, wherein the pair of rollers comprises a first roller and a second roller, providing each of the first roller and second roller at their respective surfaces at least in a determined perimeter, respectively with a plurality of polyhedron-shaped positive projections and a plurality of negative projections complementary to the positive projections, wherein the determined perimeter comprises at least one positive projection, whereby the plurality of positive projections are arranged according to a 2-dimensional grid, and whereby each one of the plurality of positive projections extends over an individual height from a base side of the positive projection at the surface of the first roller to a top side of the positive projection in a direction away from a rotation axis of the first roller, and each negative projection extends from the surface of the second roller to a bottom side of the negative projection in a direction towards the rotation axis of the second roller. The plurality of polyhedron-shaped positive projections seamlessly and gaplessly join with those corresponding negative projections at the intended embossing of the foil material, hence enabling a homogeneously jointed embossed polyhedron-like shape in the foil. The method further comprises, for the purpose of

- providing a plurality of light-reflecting areas on the foil material, that are intended to reflect light in line with a table of reflectivity values for the 2-dimensional grid, according to an orientation and shape of each of the plurality of light-reflecting areas, and
- enabling a perception by the human eye of a user, of the intended reflected light on a determined wide viewing angle covered by reflected light from any of the light-reflecting areas,
- a step of adjusting for each of the plurality of light-reflecting areas to be provided, an orientation and shape of the corresponding positive projection in the 2-dimensional grid, that is intended to emboss the light-reflecting area.

In a preferred embodiment, the step of adjusting comprises at least designing each one of the plurality of the positive projections of the 2-dimensional grid, by departing from a determined base shape which has a base surface delimited by a base perimeter intended to be positioned on the surface of the first roller and a 3-dimensional shape described by a 3-dimensional shape-contour function, by applying either one operation of the following list:

- obtain the designed positive projection by leaving the determined base shape unchanged;
- cutting-off a top of the determined base shape along an individual intersection of the determined base shape with an individual shape to obtain an individual form of the top side of the determined base shape, that is used to emboss a light-reflective area intended to have a reflectivity according to the table of reflectivity values for the 2-dimensional grid, the remaining part of the determined base shape being the designed positive projection to be positioned at the surface of the first roller.

In a further preferred embodiment, the step of adjusting comprises at least designing each one of the plurality of the positive projections of the 2-dimensional grid, by departing from a determined base shape which has a base surface delimited by a base perimeter intended to be positioned on the surface of the first roller and a 3-dimensional shape described by a 3-dimensional shape-contour function, by applying either one operation of the following list:

- obtain the designed positive projection by leaving the determined base shape unchanged;
- applying an individual 3-dimensional gain-factor function to the determined base shape to obtain the designed positive projection, that is used to emboss a light reflective area intended to have a reflectivity according to the table of reflectivity values for the 2-dimensional grid, the individual 3-dimensional gain-factor function being configured to be applied to the 3-dimensional shape-contour function such that the designed positive projection has the same base perimeter as the determined base shape, the designed positive projection has no part that overlaps beyond the base perimeter, and any point in the contour of the designed positive projection is free from overlap with another point of the contour maintaining a base surface of the determined base shape intended to be positioned at the surface of the first roller and, resulting in an overall deformation of the determined base shape in proportion to the individual gain factor.

In a further preferred embodiment, the step of adjusting comprises at least designing each one of the plurality of the positive projections of the 2-dimensional grid, by departing from a determined base shape which has a base surface delimited by a base perimeter intended to be positioned on the surface of the first roller and a 3-dimensional shape described by a 3-dimensional shape-contour function, by applying either one operation of the following list:

obtain the designed positive projection by leaving the determined base shape unchanged;

applying an individual 3-dimensional offset function to the determined base shape to obtain the designed positive projection, that is used to emboss a light-reflective area intended to have a reflectivity according to the table of reflectivity values for the 2-dimensional grid, the individual 3-dimensional offset function being configured to be applied to the 3-dimensional shape-contour function such that each value of the 3-dimensional shape-contour function is potentially changed from a respective individual height to a corresponding modified height, resulting in an overall deformation of the determined base shape in relation to the 3-dimensional individual offset.

In a further preferred embodiment, the 2-dimensional grid comprises a tessellation of grid surfaces, each grid surface comprising a grid surface perimeter with a plurality of corners, wherein single ones of the plurality of positive projections are positioned at corresponding corners, each corner comprising at most a single positive projection.

In a further preferred embodiment, the 2-dimensional grid comprises a tessellation of grid surfaces, each grid surface comprising a grid surface perimeter with a plurality of corners, wherein single ones of the plurality of positive projections are positioned in corresponding individual grid surfaces, each individual grid surface comprising at most a single positive projection.

In a further preferred embodiment, the 2-dimensional grid is an unstructured grid.

In a further preferred embodiment, the 2-dimensional grid is a regular grid.

In a further preferred embodiment, the 2-dimensional grid is one of the list comprising: a Cartesian grid, a rectilinear grid, a curvilinear grid.

In a further preferred embodiment, the 2-dimensional grid comprises a plurality of rows and columns, the tessellation of grid surfaces is organized in the plurality of rows and columns, and further single ones of the plurality of positive projections are positioned in corresponding individual grid surfaces in rows. The positive projections are spaced among each other according to a value of a first step function that describes a distance between grid surfaces in a direction of the row. Adjacent rows of positive projections are separated by a value of a second step function that describes a distance between grid surfaces in a direction of the column.

In a further preferred embodiment, wherein in each of the rows of positive projections, between two consecutive positive projections, a second negative projection is provided on the first roller, such that a plurality of second negative projections becomes arranged in the same row as the positive projections, the second negative projections of the row being regularly spaced among each other according to the value of the first step function, and whereby adjacent rows of second negative projections are separated by the value of the second step function. Each second negative projection extends from the surface of the first roller to a bottom side of the second negative projection in a direction towards the rotation axis of the first roller. The method further comprises, from one row to an adjacent row, providing next to a positive projection from the one row in the adjacent alignment a further second negative projection distant from the positive projection in column direction, whereby two consecutive second negative projections in a same column are separated by the value of the second function. The method further comprises providing on the second roller a plurality of second positive projections complementary to the second negative projections, and the plurality of second negative projections seamlessly and gaplessly join with those corresponding second positive projections at the intended embossing of the foil material.

In a further preferred embodiment, the method further comprises providing the first roller at least on the surface in the determined perimeter, with a relief topography comprising at least one of an elevation or a depression of the surface, providing on the second roller a complementary relief topography complementary to the relief topography, whereby the 2-dimensional grid is projected onto the relief topography.

In a further preferred embodiment, the step of providing each of the first roller and second roller at their respective surface with respectively positive and negative projections applies to surfaces of a plurality of determined perimeters, and the 2-dimensional grid is different for each of at least two surfaces of distinct determined perimeters, each of the 2-dimensional grids being associated to its own table of reflectivity values.

In a further preferred embodiment, the individual height (h) is less or equal to 500 μm.

In a further preferred embodiment, the foil material is anyone of the list comprising packaging material and films such as metallic foils, metallized papers, polymer films, laminates and the like.

In a further preferred embodiment, the foil material is for anyone application of the list comprising a seal pack with decoration for, e.g., smoking articles, a blister pack with decoration on a cover foil for, e.g., smoking articles or medication, a soft-wrap for sweet goods, a Tetra Brik (registered trademark) with decoration, a decoration of cover foil for beverage capsules, a wrapping-decoration of chewing gum.

In a further preferred embodiment, the method further comprises operating the pair of rollers in a quick-change device, the quick-change device including a housing with a first and a second mounting for receiving respectively a first roller carrier and a second roller carrier, the first roller carrier configured for fastening the first or the second roller which is driven via a drive and the second roller carrier configured for fastening respectively the second or the first roller, the quick-change device further configured to enable a pushing of the first roller carrier into the first mounting and the second roller carrier into the second mounting.

In a second aspect, the invention provides an embossing device configured for embossing of individually light-reflecting areas on a foil material, the device comprising a pair of roller configured to form a roller nip for admission of the foil material, wherein the pair of rollers comprises a first roller and a second roller, each of the first roller and second roller comprising at their respective surfaces at least in a determined perimeter, respectively a plurality of polyhedron-shaped positive projections and a plurality of negative projections complementary to the positive projections, wherein the determined perimeter comprises at least one positive projection. The plurality of positive projections are arranged according to a 2-dimensional grid. Each one of the plurality of positive projections extends over an individual height from a base side of the positive projection at the surface of the first roller to a top side of the positive projection in a direction away from a rotation axis of the first roller, and each negative projection extends from the surface of the second roller to a bottom side of the negative projection in a direction towards the rotation axis of the second roller. The plurality of polyhedron-shaped positive projections are shaped to seamlessly and gaplessly join with those corresponding negative projections at the intended embossing of the foil material, hence enabling a homogeneously jointed embossed polyhedron-like shape in the foil. The device further comprises, for the purpose of providing a plurality of light-reflecting areas on the foil material, that are intended to reflect light in line with a table of reflectivity values for the 2-dimensional grid, according to an orientation and shape of each of the plurality of light-reflecting areas, and enabling a perception by the human eye of a user, of the intended reflected light on a determined wide viewing angle covered by reflected light from any of the light-reflecting areas, for each of the plurality of light-reflecting areas to be provided, a corresponding positive projection that is adjusted in an orientation and shape, in the 2-dimensional grid, that is intended to emboss the light-reflecting area.

In a preferred embodiment, each one of the plurality of the positive projections of the 2-dimensional grid, is described by departing from a determined base shape which has a base surface delimited by a base perimeter intended to be positioned on the surface of the first roller and a 3-dimensional shape described by a 3-dimensional shape-contour function, by applying either one operation of the following list:

obtain the designed positive projection by leaving the determined base shape unchanged;

cutting-off a top of the determined base shape along an individual intersection of the determined base shape with an individual shape to obtain an individual form of the top side of the determined base shape, that is used to emboss a light-reflective area intended to have a reflectivity according to the table of reflectivity values for the 2-dimensional grid, the remaining part of the determined base shape being the designed positive projection to be positioned at the surface of the first roller.

In a further preferred embodiment, each one of the plurality of the positive projections of the 2-dimensional grid, is described by departing from a determined base shape which has a base surface delimited by a base perimeter intended to be positioned on the surface of the first roller and a 3-dimensional shape described by a 3-dimensional shape-contour function, by applying either one operation of the following list:

obtain the designed positive projection by leaving the determined base shape unchanged;

applying an individual 3-dimensional gain-factor function to the determined base shape to obtain the designed positive projection, that is used to emboss a light-reflective area intended to have a reflectivity according to the table of reflectivity values for the 2-dimensional grid, the individual 3-dimensional gain-factor function being configured to be applied to the 3-dimensional shape-contour function thereby such that the designed positive projection has the same base perimeter as the determined base shape, the designed positive projection has no part that overlaps beyond the base perimeter, and any point in the contour of the designed positive projection is free from overlap with another point of the contour maintaining a base surface of the determined base shape intended to be positioned at the surface of the first roller and, resulting in an overall deformation of the determined base shape in proportion to the individual gain factor.

In a further preferred embodiment, each one of the plurality of the positive projections of the 2-dimensional grid, is described by departing from a determined base shape which has a base surface delimited by a base perimeter intended to be positioned on the surface of the first roller and a 3-dimensional shape described by a 3-dimensional shape-contour function, by applying either one operation of the following list:

obtain the designed positive projection by leaving the determined base shape unchanged;

applying an individual 3-dimensional offset function to the determined base shape to obtain the designed positive projection, that is used to emboss a light-reflective area intended to have a reflectivity according to the table of reflectivity values for the 2-dimensional grid, the individual 3-dimensional offset function being configured to be applied to the 3-dimensional shape-contour function such that each value of the 3-dimensional shape-contour function is potentially changed from a respective individual height to a corresponding modified height, resulting in an overall deformation of the determined base shape in relation to the 3-dimensional individual offset function.

In a further preferred embodiment, the 2-dimensional grid comprises a tessellation of grid surfaces, each grid surface comprising a grid surface perimeter with a plurality of corners, and wherein single ones of the plurality of positive projections are positioned at corresponding corners, each corner comprising at most a single positive projection.

In a further preferred embodiment, the 2-dimensional grid comprises a tessellation of grid surfaces, each grid surface comprising a grid surface perimeter with a plurality of corners, wherein single ones of the plurality of positive projections are positioned in corresponding individual grid surfaces, each individual grid surface comprising at most a single positive projection.

In a further preferred embodiment, the 2-dimensional grid is an unstructured grid.

In a further preferred embodiment, the 2-dimensional grid is a regular grid.

In a further preferred embodiment, the 2-dimensional grid is one of the list comprising: a Cartesian grid, a rectilinear grid, a curvilinear grid.

In a further preferred embodiment, the 2-dimensional grid comprises a plurality of rows and columns, the tessellation of grid surfaces is organized in the plurality of rows and columns, further wherein single ones of the plurality of positive projections are positioned in corresponding individual grid surfaces in rows, the positive projections being spaced among each other according to a value of a first step function that describes a distance between grid surfaces in a direction of the row, whereby adjacent rows of positive projections are separated by a value of a second step function that describes a distance between grid surfaces in a direction of the column.

In a further preferred embodiment, in each of the rows of positive projections, between two consecutive positive projections, a second negative projection is provided on the first roller, such that a plurality of second negative projections becomes arranged in the same row as the positive projections, the second negative projections of the row being regularly spaced among each other according to the value of the first step function, and whereby adjacent rows of second negative projections are separated by the value of the second step function. Each second negative projection extends from the surface of the first roller to a bottom side of the second negative projection in a direction towards the rotation axis of the first roller. The device further comprises, from one row to an adjacent row, providing next to a positive projection from the one row in the adjacent alignment a further second negative projection distant from the positive projection in column direction, whereby two consecutive second negative projections in a same column are separated by the value of the second function. The device further comprises on the second roller a plurality of second positive projections complementary to the second negative projections, and the plurality of second negative projections seamlessly and gaplessly join with those corresponding second positive projections at the intended embossing of the foil material.

In a further preferred embodiment, the device further comprises on the first roller at least on the surface in the determined perimeter, a relief topography comprising at least one of an elevation or a depression of the surface, on the second roller a complementary relief topography complementary to the relief topography. The 2-dimensional grid is projected onto the relief topography.

In a further preferred embodiment, on each of the first roller and second roller there is comprised at their respective surface respectively positive and negative projections in surfaces of a plurality of determined perimeters, and the 2-dimensional grid is different for each of at least two surfaces of distinct determined perimeters, each of the 2-dimensional grids being associated to its own table of reflectivity values.

In a further preferred embodiment, the individual height (h) is less or equal to 500 μm.

In a further preferred embodiment, the foil material is anyone of the list comprising packaging material and films such as metallic foils, metallized papers, polymer films, laminates and the like.

In a further preferred embodiment, the foil material is for anyone application of the list comprising a seal pack with decoration for, e.g., smoking articles, a blister pack with decoration on a cover foil for, e.g., smoking articles or medication, a soft-wrap for sweet goods, a Tetra Brik (registered trademark) with decoration, a decoration of cover foil for beverage capsules, a wrapping-decoration of chewing gum.

In a further preferred embodiment, the device further comprises a quick-change device configured to operate the pair of rollers, the quick-change device including a housing with a first and a second mounting for receiving respectively a first roller carrier and a second roller carrier, the first roller carrier configured for fastening the first or the second roller which is driven via a drive and the second roller carrier configured for fastening respectively the second or the first roller, the quick-change device further configured to enable a pushing of the first roller carrier into the first mounting and the second roller carrier into the second mounting.

BRIEF DESCRIPTION OF THE DRAWINGS

The invention will be better understood through the detailed description of preferred embodiments of the invention, and in view of the figures, wherein

FIG. 2*c* shows the case where the two rollers are not perfectly falling in place and the foil material is pinched by the sidewalls of the pyramids;

DETAILED DESCRIPTION OF PREFERRED EMBODIMENTS OF THE INVENTION

Figure 1:
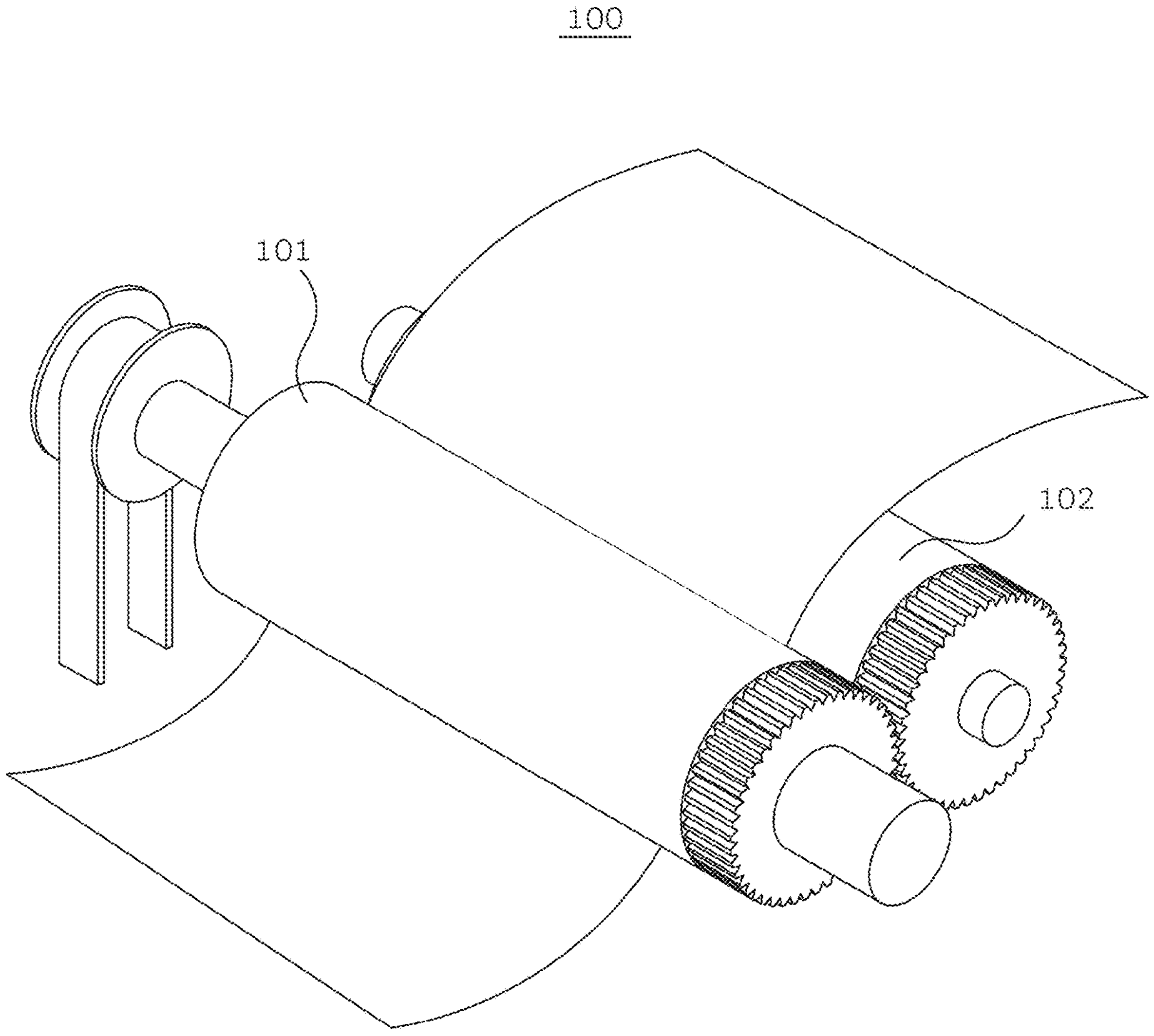
FIG. 1 (Prior art)
FIG. 1 shows an embossing device with a foil according to prior art.

In a first step towards addressing the object of the invention, the invention departs from prior art reference WO2015/028939 A1 that enables to obtain an embossed product with a better reflectivity of the metallized surfaces, as well as for the embossing rollers, a precise generation of pyramid shapes in the micrometer range. By using exaggerated relief heights as well as the usage of pedestal effects, increased brilliance in logo designs is achieved. However, it is noted that there was no means to create shading or half-toning using the teachings of WO2015/028939 A1.

A recent successful development of a new basic embossing structure forms the basis for the significant increase in the brilliance resulting from embossed structures. The new basic embossing structure provides a solution for fine embossing that allows producing checkered-style and larger uniformly embossed areas in a step length of about 50 to 250 μm. The new basic embossing structure further provides a configuration that also reduces uncontrollable contraction in the axial direction while foils are being embossed. In addition, the new basic embossing structure provides a solution that allows producing the fine embossing over areas in a homogeneous manner on the foil.

The new basic embossing structure may be understood from the following description of an embossing method that allows embossing a material from both sides. The embossing method comprises at least feeding the foil material into a roll nip between a pair of a first roll and a second roll, providing the first roll and the second roll each with a plurality of positive projections and a plurality of negative projections of identically shaped polyhedral structures, the positive projections are elevated above a mean cylindrical surface of their roll, and the negative projections are recesses reaching below the mean cylindrical surface of their roll, a first subset of the plurality of positive projections being disposed with a first periodicity on a first grid in axial direction and a second periodicity on the first grid in circumferential direction on the first roll, and a second subset of the plurality of negative projections being disposed with the first periodicity in axial direction and the second periodicity in circumferential direction on the first grid intertwined with the positive projections, in axial and circumferential directions respectively, and a third subset of the plurality of positive projections and a fourth subset of the plurality of negative projections being disposed on a second grid complementary to the first grid, on the second roll, each of the positive projections and the negative projections on the first roll during operation of the rolls and in the roll nip, except for projections located on edges of the first grid, being surrounded on all sides by positive projections and negative projections on the second roll, the positive projections of the first roll together with alternating corresponding negative projections on the second roll forming during the operation of the rolls and in the roll nip, a first straight line (y-y) substantially parallel to the axial direction, and the negative projections of the first roll together with alternating corresponding positive projections on the second roll forming during the operation of the rolls and in the roll nip, a second straight line (x-x) substantially parallel to the axial direction. The embossing method further comprises disposing in the first grid the positive projections and the negative projections such that in the axial direction on the first roll each positive projection shares a lateral base border with at least one negative projection adjacent to the positive projection, where the first straight line (y-y) and the second straight line (x-x) are coincident in a single third line (z-z), and during the operation of the rolls and in the roll nip, all lateral oblique surfaces of the positive and negative projections of the first roll are just above the surface in full faced view with the corresponding lateral oblique surfaces of the respective negative and positive projections of the second roll, thereby enabling a homogeneous distribution of pressure to the material.

Figure 4:
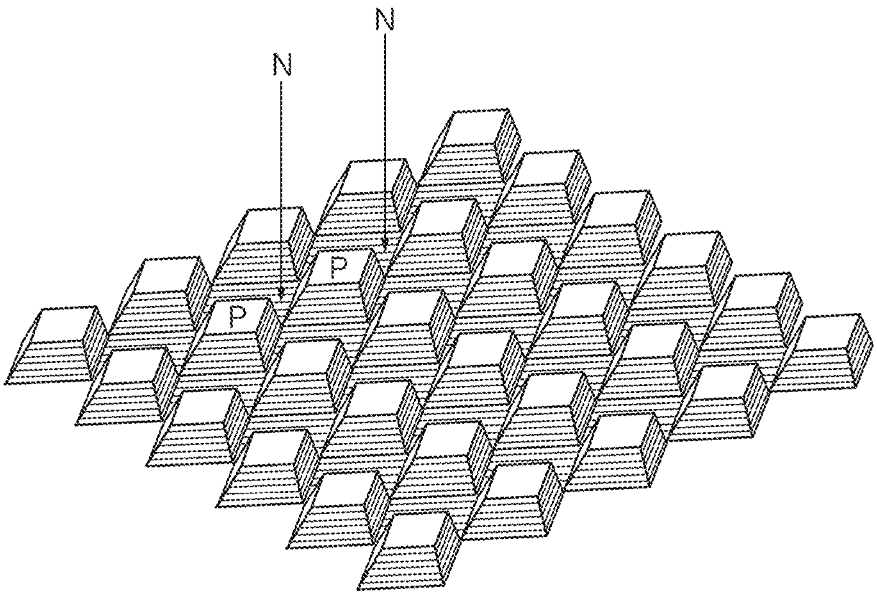
FIG. 4 shows a new basic embossing structure for an embossing roll according to an example embodiment.

In FIG. 4, showing an example embodiment of the new basic embossing structure, the embossing pattern corresponds to a structured surface of one of the rolls, whereby the positive projections P are elevated above a mean cylindrical surface of one of the rolls (not referenced in FIG. 4), and the negative projections N are recesses reaching below the mean cylindrical surface. The positive projection P and the negative projections N are identically shaped polyhedral structures, whereby the positive projections P are symmetrically shaped relative to the negative projections N when considered from the mean surface. Another one of the rolls (not shown in FIG. 4) comprises on its cylindrical surface a matching embossing pattern which is positioned such that at a time of operation for embossing, both embossing patterns interact like congruent structures to emboss the product or material on both sides, such that each of the projections on each roll becomes surrounded on all sides by projections on the other roll.

Figure 5:
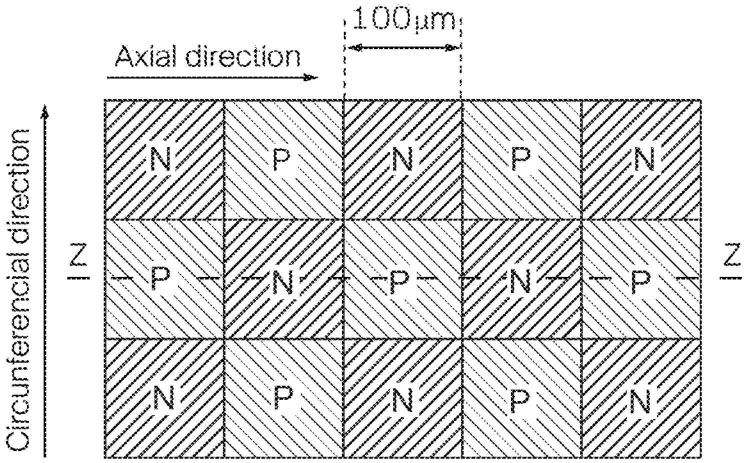
FIG. 5 is a layout plan of projections corresponding to the new basic embossing structures from FIG. 4.

FIG. 5 shows a layout plan of projections corresponding to embossing structures from FIG. 4, in fact only a part of the embossing pattern from FIG. 4, comprising positive projections P and negative projections N. A double arrow shows an order of magnitude for the structures in the embossing pattern, which lies around 100 μm in any lateral direction. The exact dimensions are irrelevant for the present explanation; it is only intended to indicate an order of magnitude for the size of the projections in the invention.

The use of the embossing pattern of FIG. 4 and a corresponding inverse embossing pattern on respective rolls of a pair of embossing rolls, to emboss a foil or inner-liner confers a 100% embossing coverage of the embossed surface.

Returning to FIG. 5, which for the sake of discussion represents the embossing pattern located on the first roll of a pair of rolls, it is to be imagined that a corresponding embossing pattern is located on the second roll of the pair of rolls (not represented in FIG. 5). As is apparent from FIG. 5, the positive projections P and the negative projections N are disposed in a grid such that in the axial direction, each positive projection P shares a lateral base border—in FIG. 5 these are represented as the lines delimitating the projections and separating one projection from the adjacent neighboring projection—with a least one negative projection N adjacent to the positive projection P.

Using the embossing pattern with the new basic embossing structure, it is possible to obtain a homogeneous distribution of pressure to the material, i.e., a regular and homogenous balance between the pressure on the lateral oblique surfaces of the positive projections P and negative projections N, mitigated perhaps only by variations of the material thickness that occur over a certain range of tolerances. Furthermore, axial contraction of the embossed foil is reduced and a smoother surface is obtained compared to the older embossing technologies of the Applicant.

The embossing using the new basic embossing structure may also be called the polyhedron embossing technique.

A comparison of the spatial density of the embossed metallized areas between those achieved by using the approaches in EP0925911 and those achieved using the polyhedron embossing technique provides detailed information on the significant increase in the brilliance resulting from embossed structures.

Figure 2A:
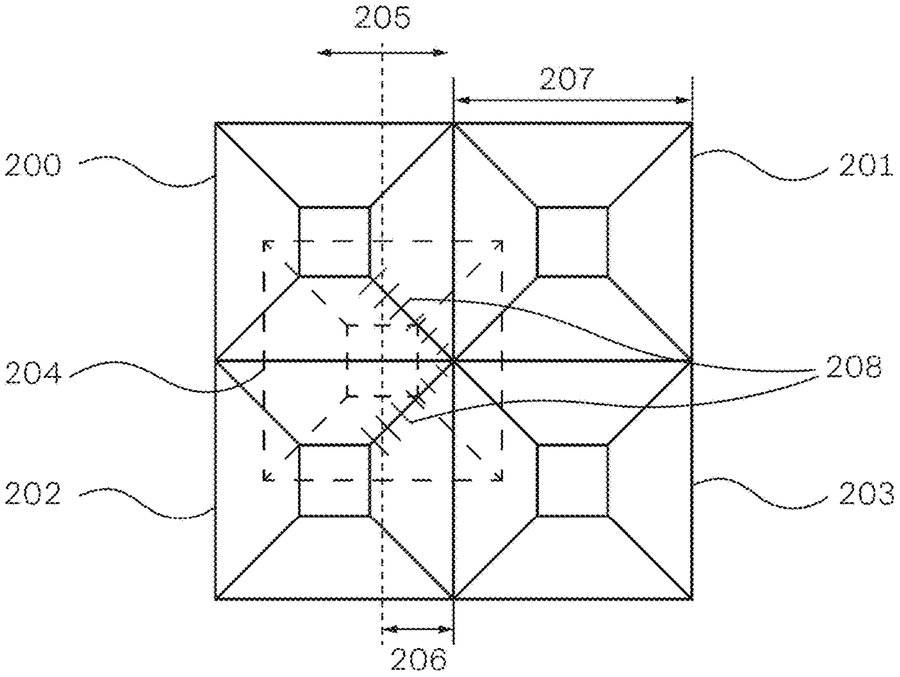
FIG. 2a (Prior art)
FIGS. 2*a*-2*c* contain illustrations of the pin-up/pin-up method according to prior art, with FIG. 2*a* a top view of pyramids that self-adjust and fall in place perfectly as shown in FIG. 2*b*.
Figure 3A:
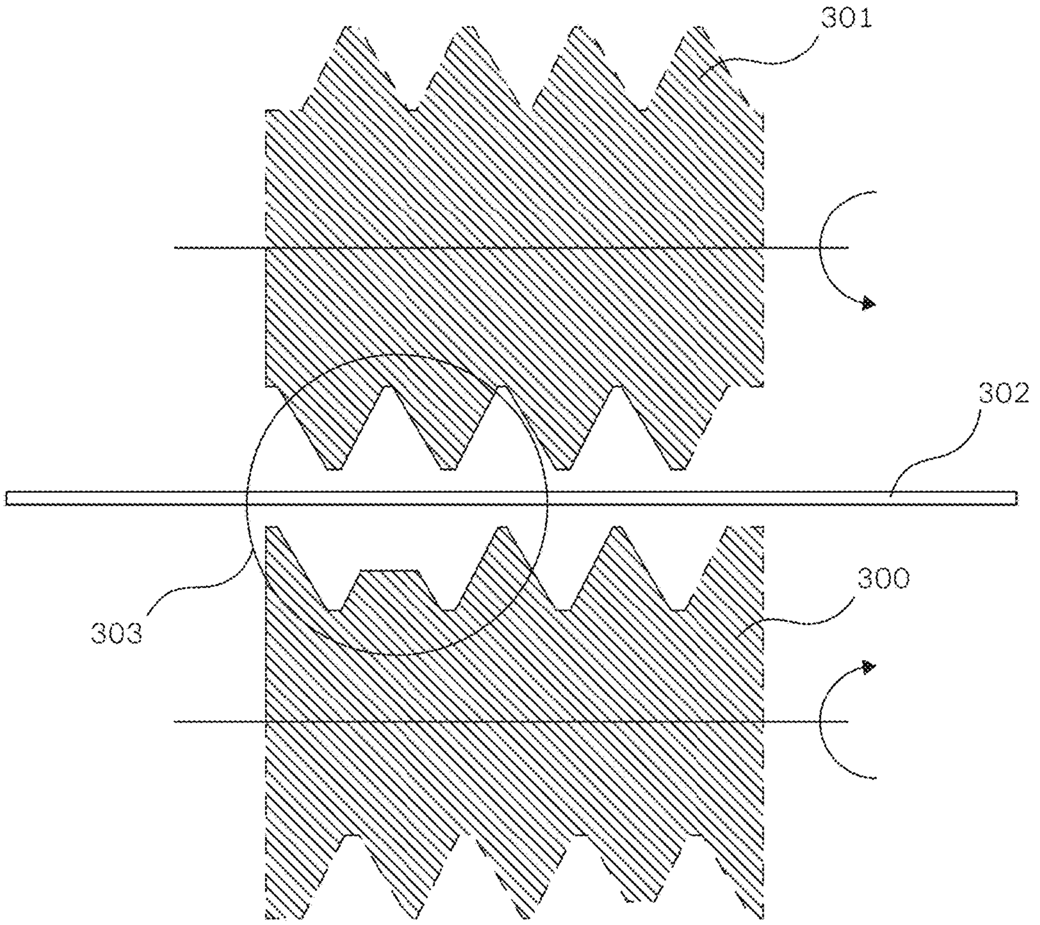
FIG. 3a (Prior art)
FIG. 3*a* shows an embossing device configuration and FIG. 3*b* illustrates a location and/or light-source dependent optical effect created by the pin-up/pin-up method according to prior art.
Figure 3B:
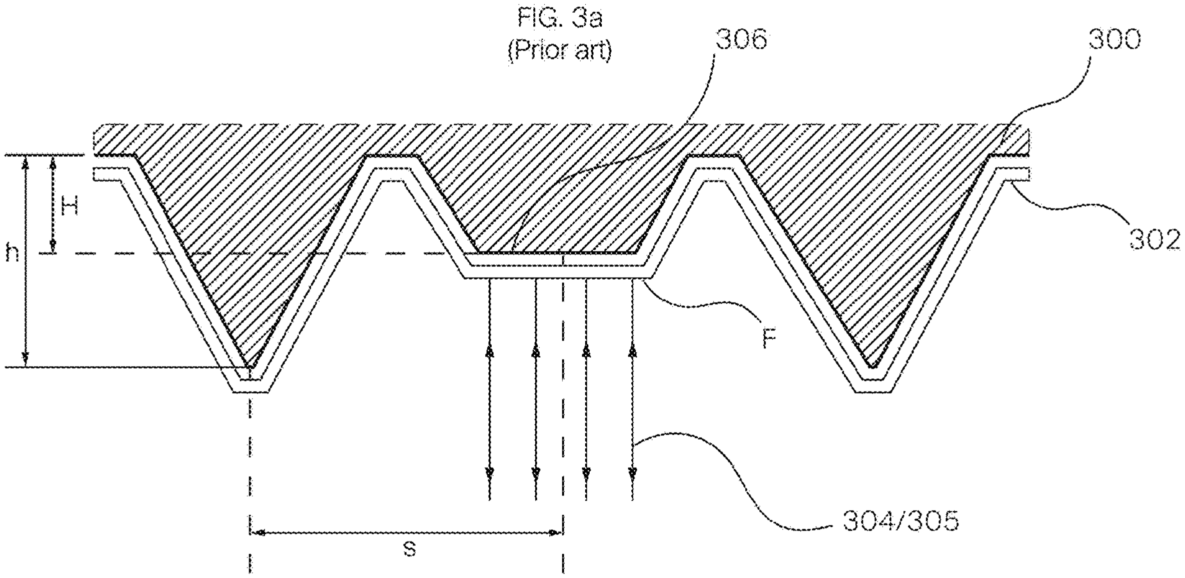
FIG. 3b (Prior art)
Figure 6:
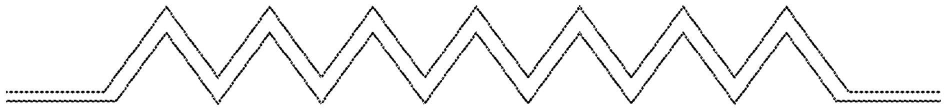
FIG. 6 shows a Patrix/Matrix embossed foil material in cross-section, for which two perfectly matching embossing rollers were used, with high control of embossing pressure.

It can be ascertained easily that the polyhedron embossing technique provides a doubling of the embossed, metallically reflecting surface in practice compared to prior art, such as, e.g., EP1324877 B1, since embossed structures obtained with positive projections and negative projections can be controlled. While with prior-art embossing systems like the ones shown for example in FIG. 2*a* and FIGS. 3*a*-3*b*, only the pressing edges of the embossing structures and not the entire pyramid surface press the film between the embossing rollers (see reference 208 in FIG. 2*a*), it may be quite easily understood that when using a patrix-matrix type embossing and obtaining for example the embossed foil material as shown in FIG. 6, there is in each embossing condition the full side surfaces of the pyramids or embossing surfaces that are enforcing pressure onto the material to be embossed (embossing not shown in FIG. 6), as the two complementary structures are pinching the foil material perfectly.

Hence, in a further step towards addressing the object of the invention, which starts from the new basic surface embossing structures with pyramids or any other polyhedron shape of different heights, one comes closer to the goal of the invention. As described herein above for the new basic embossing structure, a polyhedron-like denture is used here. This means that opposing individual embossing teeth, i.e., a positive projection on one roller and a corresponding negative projection of the counter roller, of the roller pair are exactly complementary.

The individual embossing teeth in any surface of at least a determined perimeter of a roller. Taking for example a plurality of positive projections as an embodiment of the embossing teeth, theses may be arranged according to a 2-dimensional grid comprising a tessellation of grid surfaces.

Figure 7A:
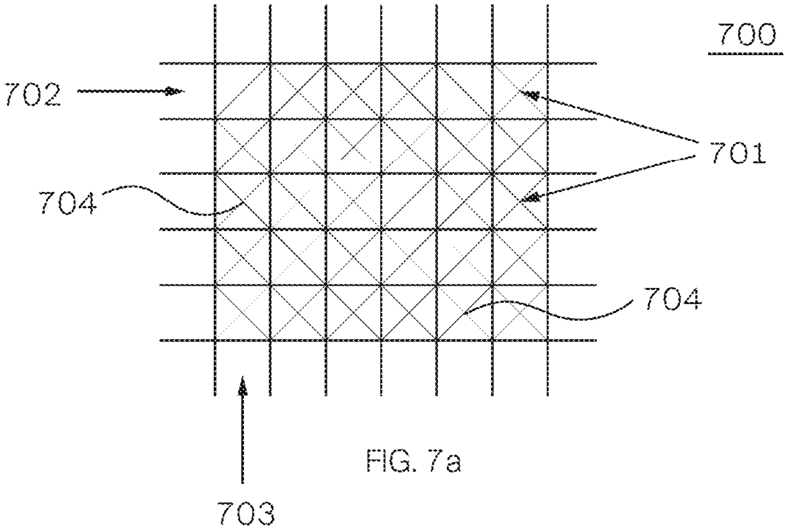
FIGS. 7*a*-7*c* contain examples of 2-dimensional regular grids according to the invention.
Figure 7B:
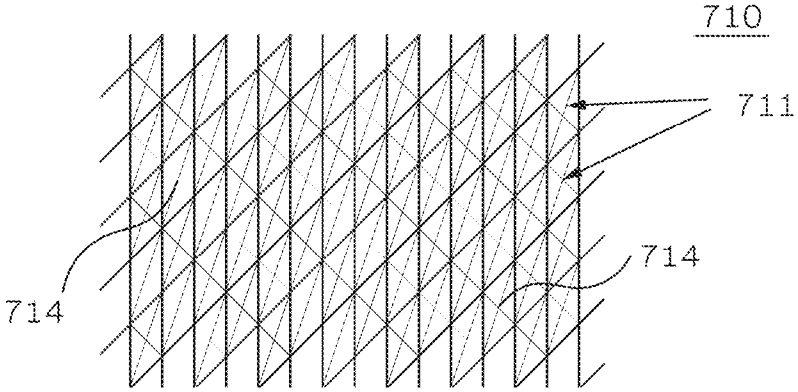
Figure 7C:
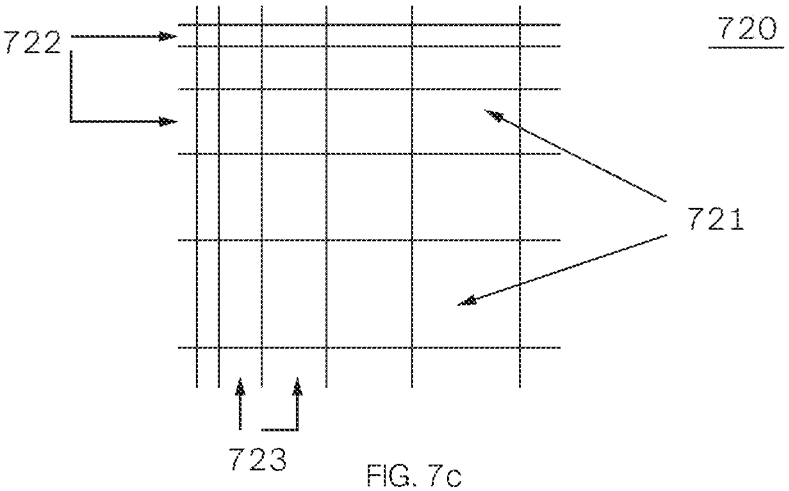

FIGS. 7*a*-7*c* contain examples of 2-dimensional grids, in this case so-called regular grids.

FIG. 7*a* shows a Cartesian grid 700 that comprises a tessellation of squares 701. In this example, in a surface delimited by a determined perimeter enclosing 30 squares, i.e., 6 squares wide in direction of a row 702, and 5 squares wide in a direction of a column 703, each square comprises for example a positive projection 704 as represented using diagonal crosses in FIG. 7*a*. Each square 701 or individual grid surface comprises at most a single positive projection.

FIG. 7*b* shows a rectilinear grid 710 that comprises a tessellation of parallelepipeds 711. In this example, in a surface delimited by a further determined perimeter enclosing 72 parallelepipeds, each parallelepiped comprises for example a positive projection 714 as represented using diagonal crosses in FIG. 7*b*. Again, each individual grid surface comprises at most a single positive projection.

FIG. 7*c* shows a further rectilinear grid 720 that comprises a tessellation of rectangles 721 of variable sizes, depending of the respective position of the rectangle 721 in a row 722 and column 723. The rectangles shown in FIG. 7*c* may all or partly be comprised in a further surface having a determined perimeter (perimeter not shown in FIG. 7*c*) and each comprise a positive projection (also not represented in FIG. 7*c*).

Figure 8A:
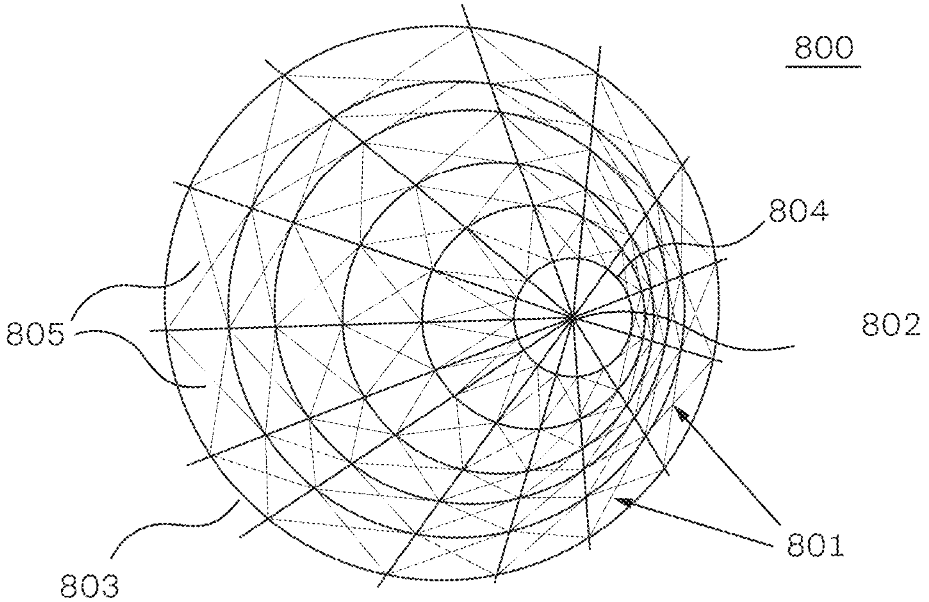
FIGS. 8*a*-8*b* contain further examples of 2-dimensional regular grids according to the invention.
Figure 8B:
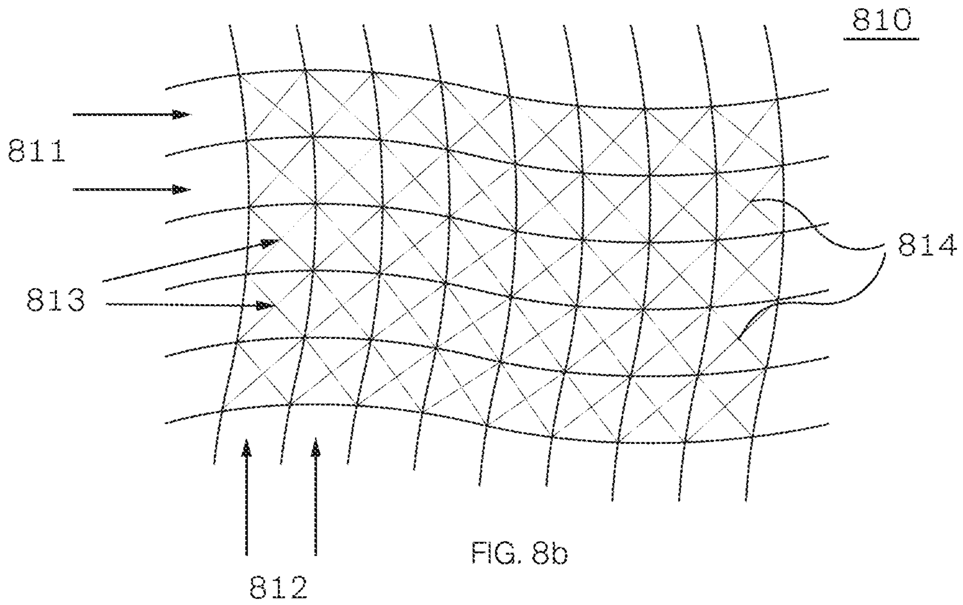

FIG. 8*a*-8*b* contain further examples of 2-dimensional regular grids.

FIG. 8*a* shows a curvilinear grid that comprises a tessellation of individual grid surfaces 801 of variable sizes, each individual grid surface being delimited by two straight lines that extend from a center 802, and two curved lines that originate respectively from concentric oval shapes. In this example, a surface delimited by determined perimeter comprising an oval shape 803 and oval shape 804 comprises a plurality of individual grid surfaces 801, each comprising for example a positive projection 805 as represented using diagonal crosses in FIG. 8*a*. Each individual grid surface 801 comprises at most a single positive projection 805. From viewing FIG. 8*a* it is apparent that a size of the individual grid surface 801 may vary from one to another, which makes it possible to have positive projections of sizes corresponding the respective surface of the individual grid surfaces 801. However, it is also possible to have identical positive projections as long as this fits in the smallest of the individual grid surfaces 801.

FIG. 8*b* shows a curvilinear grid 810 comprising curved lines that delimit individual grid surfaces 813 in rows 811 and column 812. In this example a surface delimited by a determined perimeter that surrounds a number of individual grid surfaces 813 in 5 rows 811 of 8 columns 812, comprises in each individual grid surface 813 a positive projection 814 as represented using diagonal crosses in FIG. 8*b*. Each individual grid surface 813 comprises at most a single individual positive projection 814.

Figure 9A:
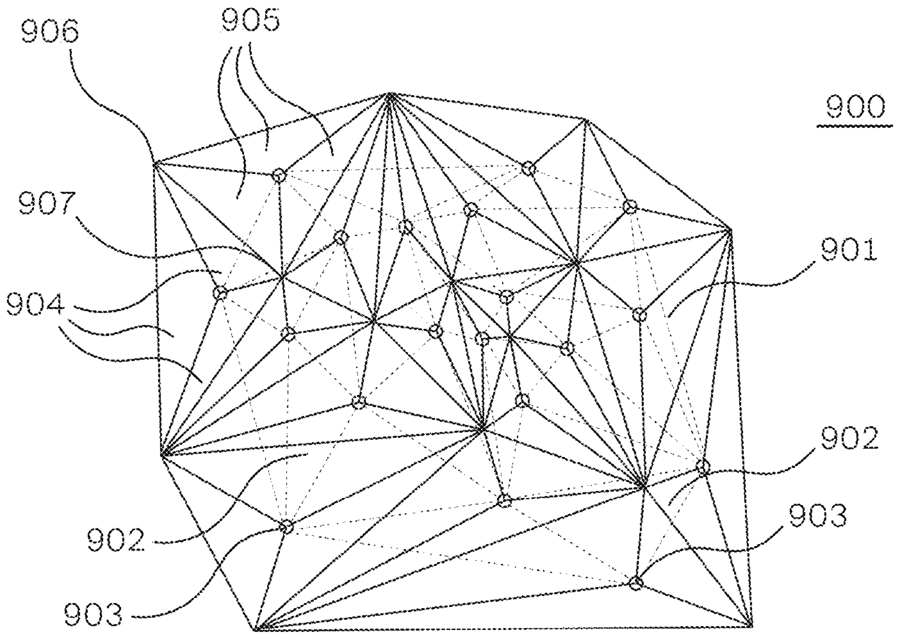
FIGS. 9*a*-9*b* contain examples of 2-dimensional unstructured grids according to the invention.
Figure 9B:
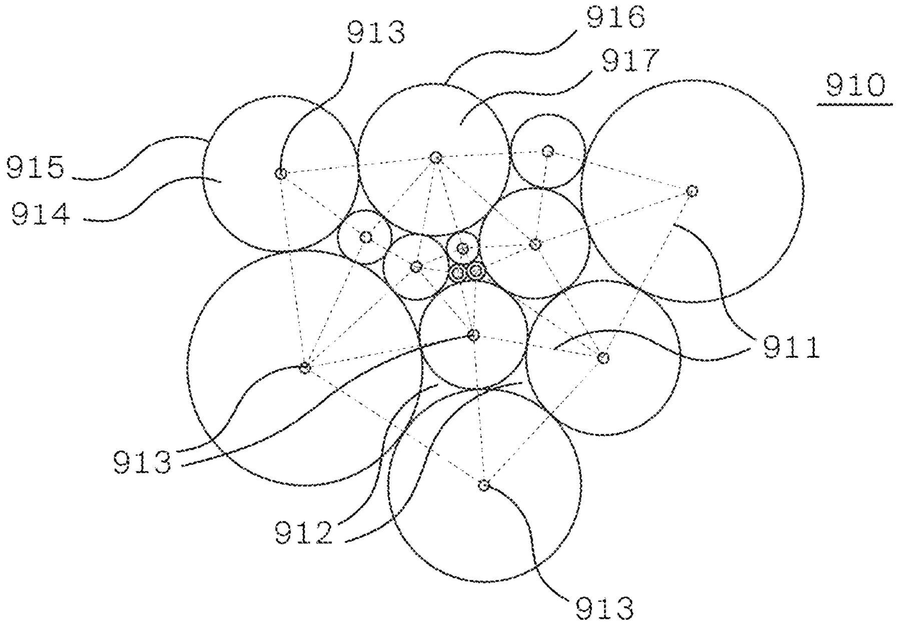

FIGS. 9*a*-9*b* contains further examples of grids, in this case unstructured grids. In general, an unstructured grid is a tessellation of a surface by simple shapes, such as triangles, in an irregular pattern.

FIG. 9*a* shows an unstructured grid 900 represented in dashed lines 901, which form triangles 902. Each triangle 902 has at least one side in common with an adjacent triangle 902, in some cases two sides, or even three sides. Corners of the triangles 902 are indicated by circles 903. In this example, the completely represented part of grid 900 comprises at each corner 903 a positive projection such as a first positive projection defined by three surfaces 904 or a second, adjacent positive projection defined by three surfaces 905. While FIG. 9*a* shows a top view of the grid 900, the positive projections are understood to raise from a surface of an embossing roller, each positive projection having a pyramidal type of shape with a summit located over one of the corners 903. The positive projections have lower corners such as the first lower corner 906 and the second lower corner 907, which may be in common from one positive projection to another. From viewing the unstructured grid 900 it is apparent that each positive projection may have an individual pyramidal shape that varies from one to another.

FIG. 9*b* shows a further unstructured grid 910 represented by straight lines 911, that define triangles 912 having corners 913 represented in circles. Each triangle 912 has at least one side in common with an adjacent triangle 912, in some cases two sides, or even three sides. In the present example, the completely represented part of grid 910 comprises at each corner 913 a positive projection 914 having a circular outer perimeter 915 at the surface of the roller (surface of the roller not shown in FIG. 9*b*) centered on a corner 913. A diameter of the outer perimeter 915 of the positive projection 914 may be adjusted to be tangent to a further outer perimeter 916 of a neighboring positive projection 917. From viewing the unstructured grid 910 it is apparent that each positive projection may have an individual outer perimeter at the surface of the roller that varies from one the other.

The individual embossing teeth may have respectively an individual polyhedric shape with one or more flat top surfaces, possibly of the same type for at least a part of the first roller surface, e.g., for at least a surface having a determined perimeter and which is covered by the individual embossing teeth. The individual polyhedric shape is intended to emboss individual light-reflecting areas in the foil material in order that the reflectivity of such light-reflecting area is adjusted to correspond to a predetermined reflectivity value. In an example embodiment, the individual embossing teeth are arranged on the first roller according to a 2-dimensional grid, and the individual polyhedric shape of each tooth must be formed in line with a table of reflectivity values for the 2-dimensional grid that describes which value of reflectivity of the embossed foil material the embossing of each tooth must produce. Such a 2-dimensional grid may for example comprise 5 rows of 5 individual embossing teeth, that is 25 embossing teeth, and the table of reflectivity values may for example be given as percentages as follows:

| | Col | | | | |
|---|---|---|---|---|---|
| Row | 1 | 2 | 3 | 4 | 5 |
| 1 | 20 | 40 | 40 | 40 | 40 |
| 2 | 20 | 40 | 40 | 40 | 40 |
| 3 | 20 | 40 | 40 | 40 | 40 |
| 4 | 40 | 60 | 60 | 40 | 40 |
| 5 | 60 | 100 | 100 | 60 | 40 |

In the above table, it is, for example, indicated that for row 1, column 1, the shape of the embossing tooth should be made to emboss individual light-reflecting areas that in total have a reflectivity of 20%. Another example for row 4, column 5 indicates that the shape of the embossing tooth should be made to emboss individual light-reflecting areas that have a total reflectivity of 40%. The reflectivity may be achieved by adjusting for each of the plurality of light-reflecting areas to provide, an orientation and shape of the corresponding positive projection (embossing tooth) in the 2-dimensional grid that is intended to emboss the light-reflecting areas. This adjustment may involve choosing a specific polyhedric shape, adjusting its height, its size, its tilting angle, and then modulating the achieved reflectivity by applying operations such as for example an offset operation, a gain factor operation or a cut-off operation. A few examples of this non-limitative list of operations will be described herein below in connection with FIG. 10. With this knowledge, it becomes a relatively simple matter to empirically determine for a specific foil material to emboss, by a simple series of test embossing followed by reflectivity measurements, a magnitude of the operation to apply to a positive projection in order to achieve a specific value of reflectivity. For example: an unchanged positive projection may lead to an embossed light-reflecting area that has a reflectivity of 100%, while applying an offset operation of 40% may for example lead to a reflectivity of 40% and an offset operation of 60% may lead to a reflectivity of 20%. This is an example only and in no way implies that there necessarily is a linear relationship between percentage of reflectivity and value of offset operation.

This example with arbitrary numbers will be better understood after the explanations below in relation for FIG. 10.

Figure 10:
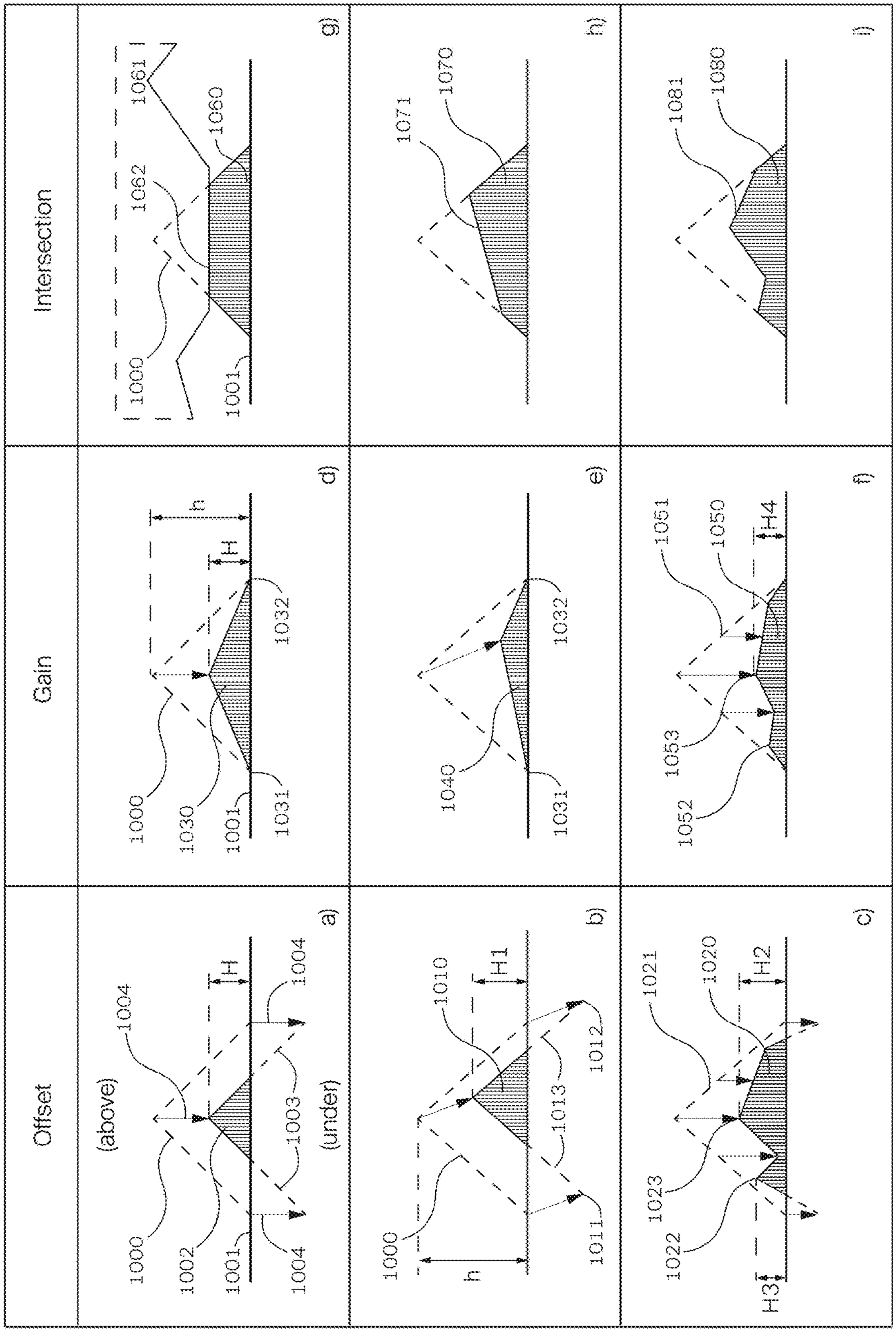
FIG. 10 is a table useful to explain manners in which positive projections may be designed according to the invention.

Referring now to FIG. 10, this contains a table useful to explain manners in which positive projections may be designed according to the invention. We will use essentially the same nomenclature as in the description of FIG. 3*b* to refer geometric dimensions of a positive projection in term of individual height h, possible truncation or modified height H and pitch s.

The table in FIG. 10 is organized in three columns entitled Offset, Gain and Intersection to designate three types of operations that may be applied to design a positive projection. The rows of the table below the titles contain example representations of the operations being applied to a determined base shape 1000 of a positive projection represented generally in dashed lines above the surface 1001 of an embossing roller (roller not shown in FIG. 10) to obtain a designed positive projection 1002 represented in a sectional view by a shape with textured surface. In cell a) of the table, the designed positive projection 1002 is of course on the side above the surface 1001, but for reasons of better understanding, its sides are extended below the surface 1001 with dashed lines 1003 to show the outline of the initial determined base shape 1000. Arrows such as arrows 1004 in cell a) are used to indicate how the determined base shape 1000 evolves to become the designed positive projection 1002, as appropriate. In cell b) of the table, the individual height h of the determined base shape 1000 is indicated for a better understanding.

More specifically, referring to cell a), this shows an operation of shaping an upper part of the determined base shape 1000 to obtain the designed positive projection 1002, the resulting shape of the upper part, i.e., the designed positive projection 1002 having a modified height H reduced by an individual offset Ioff as compared to the individual height h, whereby $$H=h-Ioff.$$

The designed positive projection 1002 is intended to be positioned at the surface of the first roller, which is represented as a reference at the surface 1001 in cell a).

In cell b), in addition to applying a second individual vertical offset Ioff2 (Ioff2 not represented in cell b)), in a direction perpendicular to the surface 1001 (which is the same as in cell a)) to modify an overall height of the determined base shape 1000 to become H1, a further transformation leading to a lateral offset or shift of all points of the determined base shape in a direction parallel to the surface 1001 is applied to obtain a designed positive projection 1010. It is noted that in the example of cell b), for sake of a better understanding, the base points 1011 and 1012, which are virtual points, and indicated at the end of virtual prolongations 1013 of sides of the designed positive projection 1010 are also subjected to the vertical and lateral shift.

In cell c), a determined base shape 1021 represented again in sectional view has a similar shape as the determined base shape 1000, but a designed positive projection 1020 has a more complex top side structure comprising two summits 1022 and 1023 and more than 2 sides, at various angles of inclinations, in contrast to the determined positive projection 1002 from cell a) which corresponds to a sectional view of a regular pyramid. However, similarly to the operation applied in cell a), here in cell c), an upper part of the determined base shape 1021 is shaped to obtain a designed positive projection 1020 that has for one summit 1023 a modified height H2 according to a third individual offset Ioff3, but for other points of a shape contour of the designed positive projection, other individual offsets are applied, for example to obtain the modified height H3 of summit 1022. In overall this is represented by variable lengths of the one-pointed arrows in cell c). The shape contour of the positive projection is shown in 2 dimensions as cell c) represents a cross section, but if the whole surface of the designed positive projection 1020 is taken under consideration, this may be obtained by applying to a 3-dimensional shape of the determined base shape 1021, described by a 3-dimensional shape-contour function, a 3-dimensional offset, which results in the different heights of the designed positive projection. The designed positive projection 1020 is intended to be positioned at the surface of the first roller.

In cell d), an operation of applying an individual gain or multiplication factor to the determined base shape 1000 is executed to obtain a designed positive projection 1030, the operation being configured such to maintain a base surface and base perimeter of the determined base shape—represented by the section delimited by points 1031 and 1032 in the sectional view of cell d)—intended to be positioned at the surface of the first roller—represented here by the surface 1001. This results in an overall deformation of the determined base shape 1000 in height direction in proportion to an individual gain factor Igain. For the height H of the designed positive projection, we have the relation:

$$H = I\text{gain} \times h.$$

In cell e), in addition to an operation of applying a gain factor to obtain the overall height of the designed positive projection, a lateral deformation is also operated on all points of the determined base shape to obtain the designed positive projection 1040, except on the points 1031 and 1032 that delimit the base surface at the surface of the roller of the determined base shape of the designed positive projection 1040.

In general, it may be noted that the determined base shape has a 3-dimensional shape described by a 3-dimensional shape-contour function, which is not further analytically detailed here. The operation of applying an individual gain factor may be described as follows: an individual 3-dimensional gain-factor function is applied to the determined base shape to obtain the designed positive projection, that is used to emboss the light-reflective area intended to have a desired reflectivity, the individual 3-dimensional gain-factor function being configured to be applied to the 3-dimensional shape-contour function thereby such that the designed positive projection has the same base perimeter as the determined base shape, the designed positive projection has no part that overlaps beyond the base perimeter, and any point in the contour of the designed positive projection is free from overlap with another point of the contour maintaining a base surface of the determined base shape intended to be positioned at the surface of the first roller and, resulting in an overall deformation of the determined base shape in proportion to the individual 3-dimensional gain factor.

In cell f), a determined base shape 1051 is represented again in sectional view using dotted lines, and the designed positive projection 1050 has a more complex top side structure with at least two summits 1052 and 1053 and a plurality of sides at various angles of inclinations. This more complex top structure, which is just a part of an overall 3-dimensional top side of the desired positive projection, results from an individual 3-dimensional gain-factor function being applied to the 3-dimensional shape-contour function of the determined base shape 1051. The desired positive projection 1050 is intended to be positioned at the surface of the first roller.

In cell g), the determined base shape 1000 is represented partly in dashed lines for its top side, and partly in a texture shape that corresponds to a designed positive projection 1060. The non-textured part of the determined base shape corresponds to the result of an operation comprising cutting-off the top of the determined base shape 1000 according to an individual shape 1061 along an individual intersection 1062 with the determined base shape 1000. The individual shape 1061 is represented above the designed positive projection 1060 for a better understanding. In a further preferred embodiment the individual shape not only affects the shape of designed positive projection 1060, but may extend to further positive projections intended to be positioned on either sides of the designed positive projection on the surface of the roller represented here by surface 1001, and hence affect the shapes of the further projections accordingly. It is understood that the individual shape is of virtual nature, and that the cutting-off of the determined base shape is operated according to a virtual representation of the individual shape, as may easily be done by a person skilled in the art for the shaping as such only. In the example of cell g), the designed positive projection 1060 corresponds to a pyramid that is cut-off parallel to the surface 1001. The designed positive projection 1060 is intended to be positioned at the surface of the first roller.

In cell h), a similar operation of cutting off as in cell c) is executed, whereby the individual intersection results in a slanted top side 1071 of a designed positive projection 1070.

In cell i), a similar operation of cutting off as in cells g) and h) is executed, whereby the individual intersection results in a more complex top side 1081 of a designed positive projection 1080.

The adjusting of a determined base shape to a desired positive projection may be modeled more generally with the help of transformation matrices. For further details, see also [David Salomon: "The Computer Graphics Manual", Springer, 2011 Edition, ISBN-13: 978-0857298850].

An offset in 3-dimensional space as applied to the determined base shape in order to move this base shape to the origin of the coordinate system X(fx,fy,fz) according to the translation transformation T as follows:

$$X(fx,fy,fz) = T(fx,fy,fz)$$

which, when expressed with the transformation matrix is:

$$\begin{bmatrix} x' \\ y' \\ z' \\ 1 \end{bmatrix} = \begin{bmatrix} 1 & 0 & 0 & fx \\ 0 & 1 & 0 & fy \\ 0 & 0 & 1 & fz \\ 0 & 0 & 0 & 1 \end{bmatrix} \begin{bmatrix} x \\ y \\ z \\ 1 \end{bmatrix}$$

Subsequently, a shear function in the xy plane and a scaling function in z-axis followed by the inverse offset operation to the original starting point and with the transformation matrix as previously demonstrated allow to obtain all desired positive projections from determined base shapes, according to the parameters of the matrices, and is expressed by the formula as follows:

$$X(fx,fy,fz,a,b,sx,sy)=T(fx,fy,fz)\cdot SH(a,b)\cdot S(sz)\cdot T(-fx,-fy,-fz)$$

and using matrices:

$$\begin{bmatrix} x' \\ y' \\ z' \\ 1 \end{bmatrix} = \begin{bmatrix} 1 & 0 & 0 & fx \\ 0 & 1 & 0 & fy \\ 0 & 0 & 1 & fz \\ 0 & 0 & 0 & 1 \end{bmatrix} \begin{bmatrix} 1 & 0 & a & 0 \\ 0 & 1 & b & 0 \\ 0 & 0 & 1 & 0 \\ 0 & 0 & 0 & 1 \end{bmatrix} \begin{bmatrix} 1 & 0 & 0 & 0 \\ 0 & 1 & 0 & 0 \\ 0 & 0 & sz & 0 \\ 0 & 0 & 0 & 1 \end{bmatrix} \begin{bmatrix} 1 & 0 & 0 & -fx \\ 0 & 1 & 0 & -fy \\ 0 & 0 & 1 & -fz \\ 0 & 0 & 0 & 1 \end{bmatrix} \begin{bmatrix} x \\ y \\ z \\ 1 \end{bmatrix}$$

Figure 11:
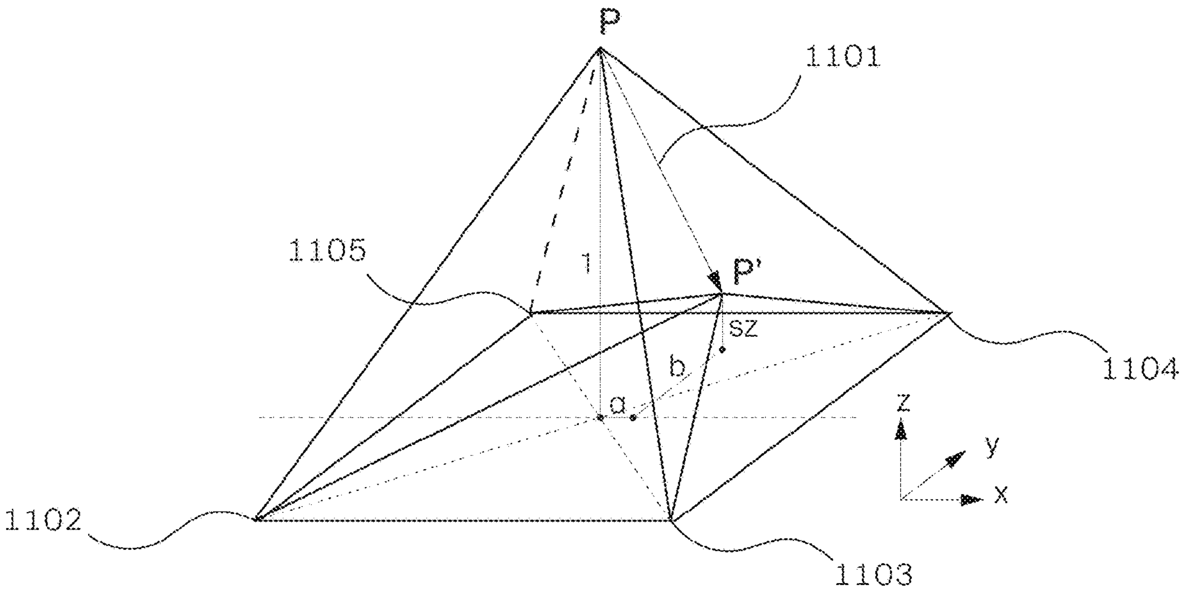
FIG. 11 is a schematic geometric construct useful to explain possible operations intended to design a positive projection.

Referring now to FIG. 11, this contains a schematic geometric construct useful to illustrate the above operation in a graphical manner, by the operation as applied to point P of a determined base shape to obtain point P'—the summit of the desired positive projection—by the 3-dimensional vector 1101. The base perimeter in this example is a rectangle defined by points 1102, 1103, 1104 and 1105. More specifically, the operation that may be explained here is the application of above matrices. In this figure, the operation is explained using a Cartesian referential (x, y, z) in which point P is projected in the xy plane, then the x-coordinate is varied according to the value a, then the y-coordinate is varied according to the value b, to eventually be displaced in z-direction according to the factor sz.

In a preferred example embodiment, on both rolls, a step spacing individual embossing teeth may remain the same along a given first direction, i.e., it also may remain the same along another given second direction but possibly with another value than that used to the first direction. Hence, in case the first direction and the second direction are axial and radial directions respectively, a value of axial steps may differ from a value of radial steps.

Figure 2B:
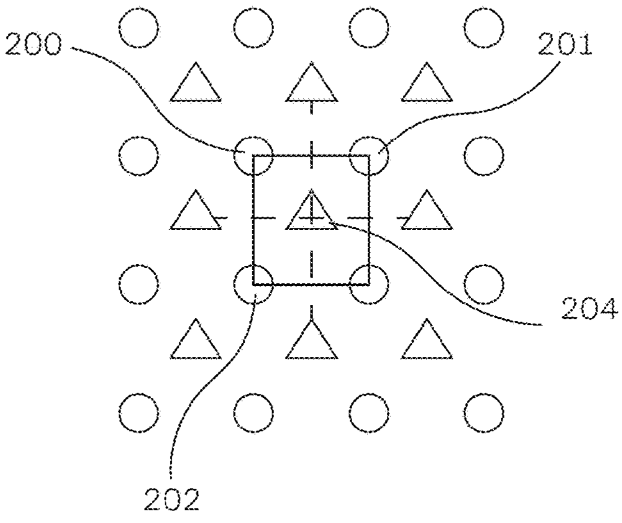
FIG. 2b (Prior art)
Figure 2C:
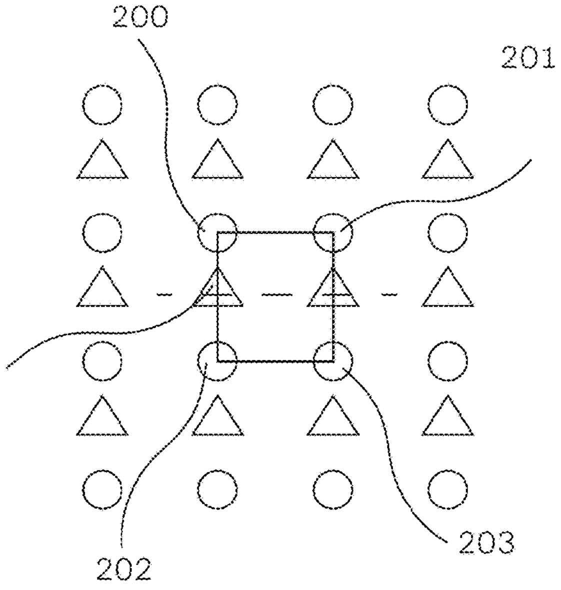
FIG. 2c (Prior art)

Resulting embossed foil materials comprise embossed tooth-shapes all over the surface. At the time of filing of the present patent application, the usual step lengths s (see FIG. 2) are comprised in a range between 50 μm and 300 μm.

The principle described in EP1324877 B1 allowed the tobacco industry in year 2000 (prior art) to manufacture from 200 to about 500 sections/min for cigarette packaging in online operation, while over 1000 sections/min are possible at the time of filing the present patent application.

Figure 12A:
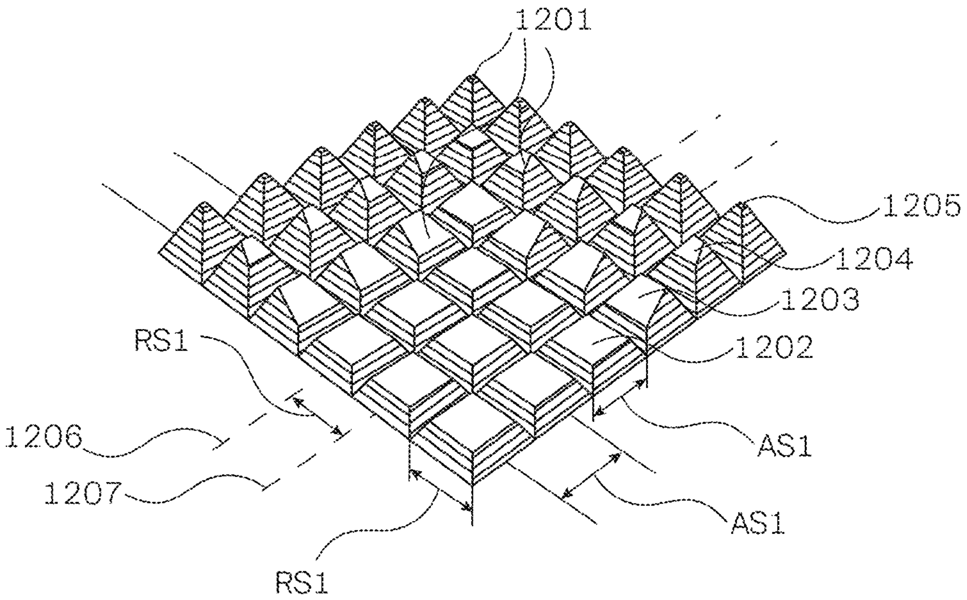
FIGS. 12*a*-12*c* illustrate examples of embossing-roller surfaces according to the invention using a direct overlay-method, i.e., a cutting-off of tops of determined base shapes along an individual intersection with an individual shape.
Figure 12B:
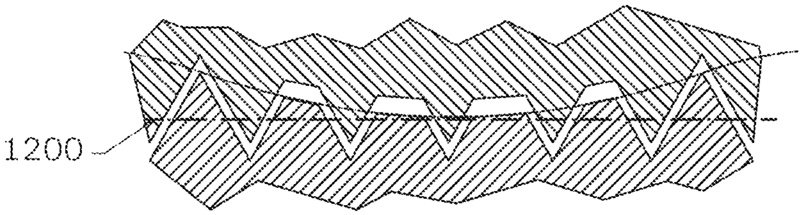
Figure 12C:
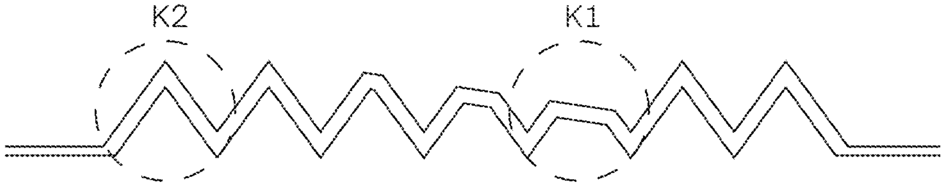
Figure 13A:
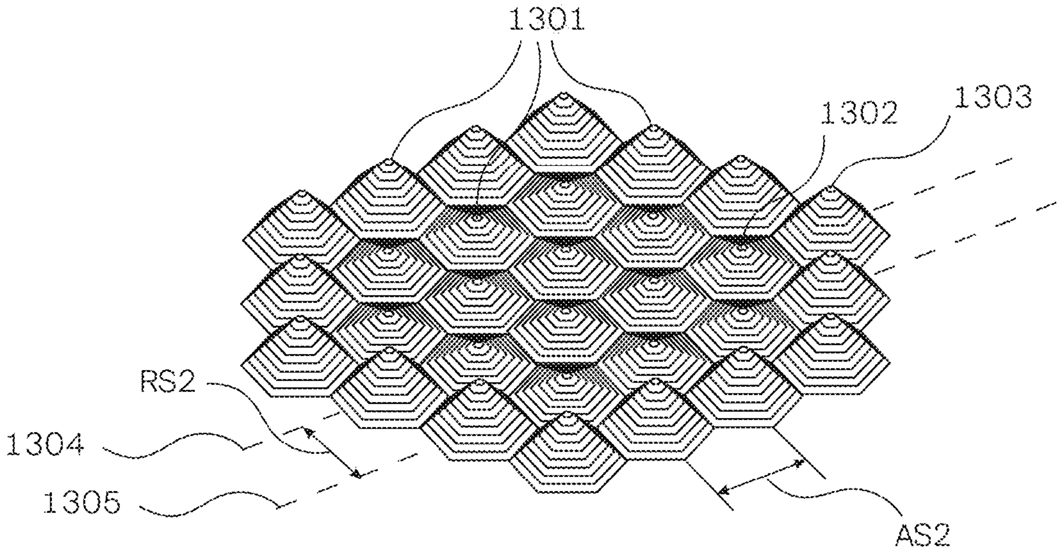
FIGS. 13*a*-13*c* illustrate examples of embossing-roller surfaces according to the invention using a height-modulation method with the same basic footprint, i.e., applying individual gain factors to the determined base shapes thereby maintaining a base surface at the surface of the roller.
Figure 13B:
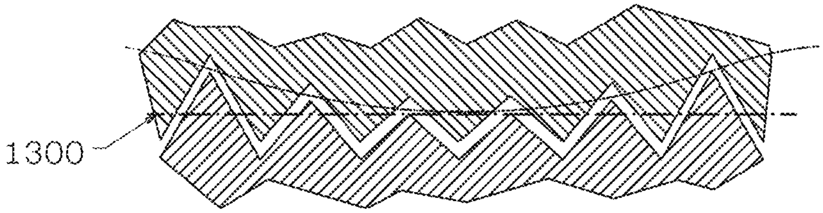
Figure 14A:
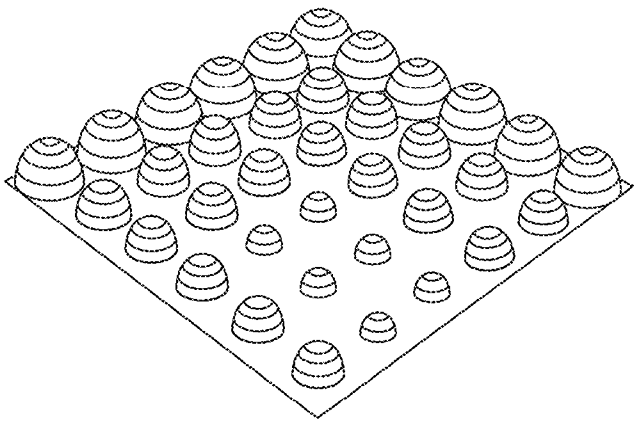
FIGS. 14*a*-14*c* illustrate examples of embossing-roller surfaces according to the invention using a height-modulation method with a varying footprint, i.e., shaping an upper part to the determined base shapes according to individual offsets.
Figure 14B:
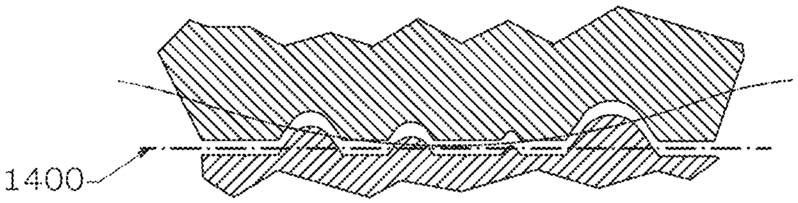
Figure 14C:
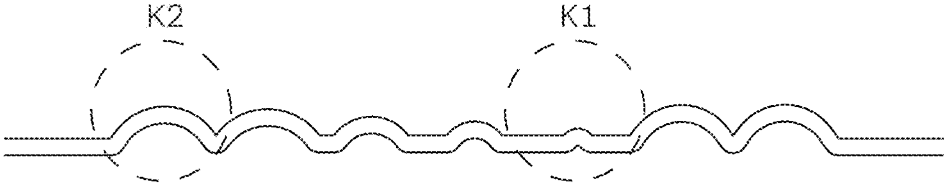

FIG. 12*a*, FIG. 13*a* and FIG. 14*a* show several variants of surfaces with positive projections, of a respective first embossing roller (embossing roller not shown in any of the referenced figures) according to the invention (complementary counter-roller not shown either). It is understood that for the embossing of material according to the invention, the counter roller comprises negative projections complementary to the positive projections, in a manner that the positive projections seamlessly and gaplessly join with those corresponding negative projections at the intended embossing of the foil material, hence enabling a homogeneously jointed embossed shape in the material.

FIG. 12*a* shows an example comprising positive projections embodied as pyramidal teeth 1201, each pyramidal tooth having a substantially square base, but in the overall, the pyramidal teeth being designed to comprise truncations, e.g., truncations 1202, 1203, 1204 and 1205 that may vary from one tooth to another one, in terms of a combination of an angle of inclination and of a height, resulting in surfaces of sizes that may vary from one tooth 1201 to another tooth 1201. In other words, the truncations define respective top sides of the pyramids, and each pyramid extends from a base surface of the roller on which they are made (roller not shown in FIG. 12*a*) to its top side in a direction away from a rotation axis of the roller (rotation axis also not shown in FIG. 12*a*). The truncations may be obtained using operations described for cells g) and h) in the table of FIG. 10, i.e., they are the result of an operation comprising cutting off the tops of the determined base shapes as appropriate—the determined base shape here would be a non-truncated pyramid—with an individual shape along an individual intersection with the determined base shapes, the individual shape "covering" at least all truncated pyramids. As already explained, the individual shape is of virtual nature and the intersection is determined accordingly.

For example, FIG. 12*a* shows that truncation 1203 is at a different angle than truncation 1202, and that the overall height of the pyramid with truncation 1202 is smaller than the overall height of the pyramid with truncation 1203.

The pyramids, which effectively are positive projections from the roller surface, are arranged in a plurality of rows and columns, more specifically in the present example, in a plurality of alignments on axially oriented lines, for example a first axial line 1206 and a second axial line 1207 shown in dashed lines. The pyramids are spaced in the rows according to a value of a first step function, which in the present example describes a regular spacing among each other according to an axial step AS1. Adjacent axially oriented alignments of pyramids, such as the first axial line 1206 and the second axial line 1207 are separated in distance according to a value of a second step function, which in the present example is a radial step RS1.

The axial step AS1 and the radial step RS1 may be equal, but in preferred embodiments, depending on the overall requirements, they may also differ from each other according to the first step function and the second step function respectively. These functions may be of any type, for example linear (as in the present example), non-linear, etc.

The variations of the truncations of the pyramids, when considered over all the pyramids, define the individual shape that is cut-off in the pyramids according to a corresponding individual intersection, over the corresponding surface of the roller that comprises the pyramids. In the example of FIG. 12*a* this appears to correspond to a curved plane that is at its nearest to the roller in the lower corner of FIG. 12*a* and rises away from the roller as we depart from the lower corner to either the left, right and upper corner of the set of pyramids illustrated in FIG. 12*a*.

FIG. 13*a* shows an example comprising hexagonal pyramidal teeth 1301, each hexagonal pyramidal tooth having a substantially hexagonal base, and in the overall, the hexagonal pyramidal teeth being designed to comprise heights that may vary from one tooth to another one. More specifically for the shown example, the height of a tooth 1302 is smaller toward the inside of the overall surface, as for a peripheral tooth 1303. In other words, the heights define respective top sides of the hexagonal pyramids, and each hexagonal pyramid extends from a base surface of the roller on which they are made (roller not shown in FIG. 13*a*) to its top side in a direction away from a rotation axis of the roller (rotation axis also not shown in FIG. 13*a*).

Figure 13C:
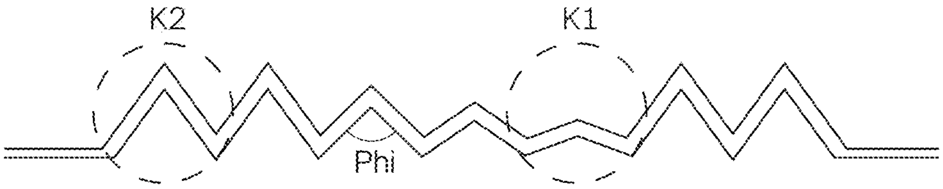

For example, FIG. 13*a* shows a first individual widening of an angle Phi (Phi not shown in FIG. 13*a*) on the top of the hexagonal pyramid 1302, Phi being shown in FIG. 13*c* and which is different from a second individual widening of angle on the top of the hexagonal pyramid 1303, which leads to different heights among pyramids 1302 and 1303. More precisely, a wider angle implies a lesser height.

In other words, the height variations of the hexagonal pyramids may be obtained by executing the operation of applying an individual gain factor as explained in relation to cell d) in the table of FIG. 10, to the determined base shape—here the determined base shape is a hexagonal pyramid with full height—to obtain a designed positive projection, the operation being configured such to maintain a base surface of the determined base shape intended to be positioned at the surface of the motor roller. This results in an overall deformation of the determined base shape in height direction in proportion to an individual gain factor Igain.

The hexagonal pyramids, which effectively are positive projections from the roller surface, are arranged in a plurality of alignments on axially oriented lines, for example a third axial line 1304 and a fourth axial line 1305 shown in dashed lines, the pyramids being regularly spaced among each other according to an axial step AS2. Adjacent axially oriented alignments of hexagonal pyramids, such as the third axial line 1304 and the fourth axial line 1305 are separated in distance by a radial step RS2.

FIG. 14*a* shows an example comprising conical structured teeth, each conical structured tooth having a substantially circular base, and in the overall, the conical structured teeth having heights and diameters of their base that may vary from one tooth to another one. More specifically, a center of each circular base is positioned on a regular grid, and the diameter of the base varies as a function of the height of the conical structured tooth. In this example, the conical structured teeth are obtained by executing an operation described for cell a) in the table of FIG. 10. More specifically, the upper part of the determined base shape—here the determined base shape is a full conical tooth—is shaped to obtain the designed positive projection, the resulting shape of the upper part, i.e., the designed positive projection having a height reduced by an individual offset Ioff as compared to the individual height h of a determined base shape.

Figure 15A:
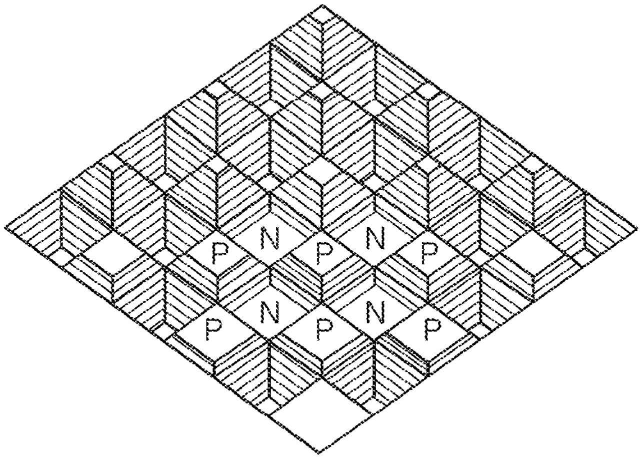
FIGS. 15*a*-15*c* illustrate examples of embossing-roller surfaces according to the invention using the direct overlay-method, i.e., a cutting-off of tops of determined base shapes along an individual intersection with an individual shape in combination with positive and negative projections in a checkered layout.
Figure 15B:
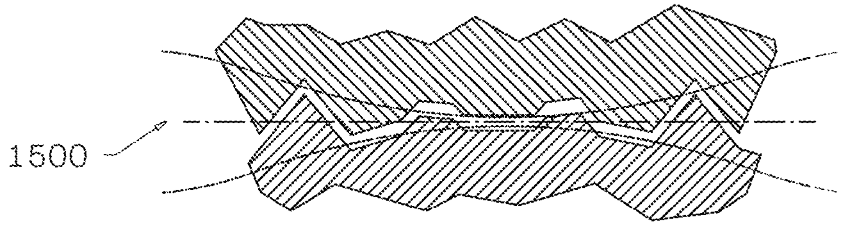
Figure 15C:
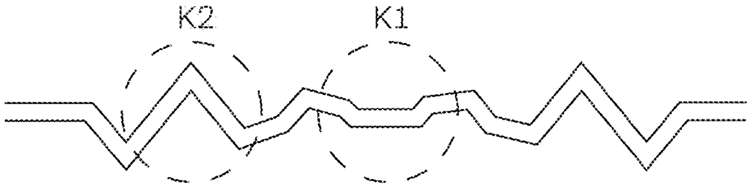

FIG. 15*a* shows an example similar to the example of FIG. 12*a*, but applying the principle to positive projections P and negative projections N on a same roller instead of positive projections only as shown in FIG. 12*a*.

In FIG. 15*a*, in each of the plurality of alignments along axially oriented lines, of positive projections P, between two consecutive positive projections P, a second negative projection N is provided on the roller, such that a plurality of second negative projections N becomes arranged in the same alignment as the positive projections P, the second negative projections being regularly spaced among each other according to the axial step, and whereby adjacent axially oriented alignments of second negative projections are separated by the radial step. Each second negative projection N extends from a base surface of the motor roller, which in substance is at the level of the square drawn around all the projections in FIG. 15*a*, to a bottom side of the second negative projection N in a direction towards the rotation axis of the motor roller (not shown in FIG. 15*a*). Further, from one alignment to an adjacent alignment, providing next to a positive projection from the one alignment, in the adjacent alignment a further second negative projection distant from the positive projection in radial direction. Hence, effectively, each positive projection is surrounded normally by four negative projections. Two consecutive second negative projections N on a same radial axis are separated by the radial step. In the example of FIG. 15*a*, since the positive projections are separated by the axial step, then compared to the illustration of FIG. 12*a*, the length of a base side of the pyramids is in substance half of that of the pyramids in FIG. 12*a*. Not shown in FIG. 15*a* is the fact that the counter roller is also provided with a plurality of second positive projections complementary to the second negative projections N of the motor roller, and the plurality of second negative projections N seamlessly and gaplessly join with those corresponding second positive projections at the intended embossing of the foil material.

The principle illustrated in FIGS. 12*a*-15*a* is applied in the present invention, according to which, and in contrast to EP1324877, each of the surface elements may be adapted more or less individually leading to a resulting relief-like embossed-film reflection when light is reflected from the embossed film. Overall, the designer now has multiple options at its disposition, compared to EP1324877, where only the pyramid height was utilized for the design. The multiple options are described herein above.

Referring now to FIG. 16, this illustrates examples of embossing roller surfaces in which a roller is provided with a relief topography, and positive projections are arranged in a 2-dimensional grid projected thereon.

Figure 16A:
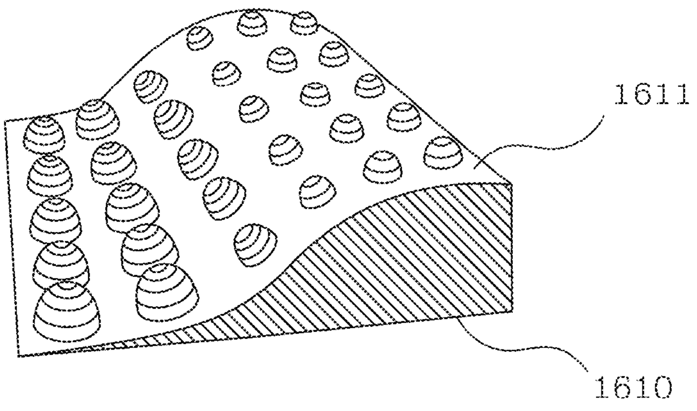
FIGS. 16*a*-16*c* illustrate examples of embossing roller surfaces in which a roller is provided with a relief topography, and positive projections are arranged in a 2-dimensional grid projected thereon.
Figure 16B:
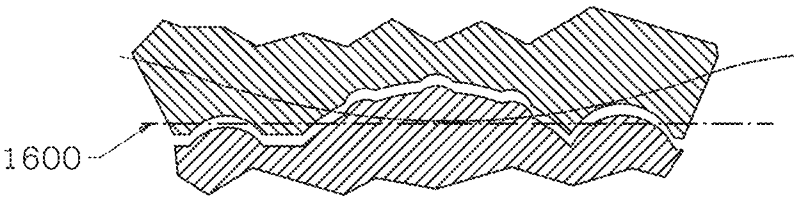
Figure 16C:
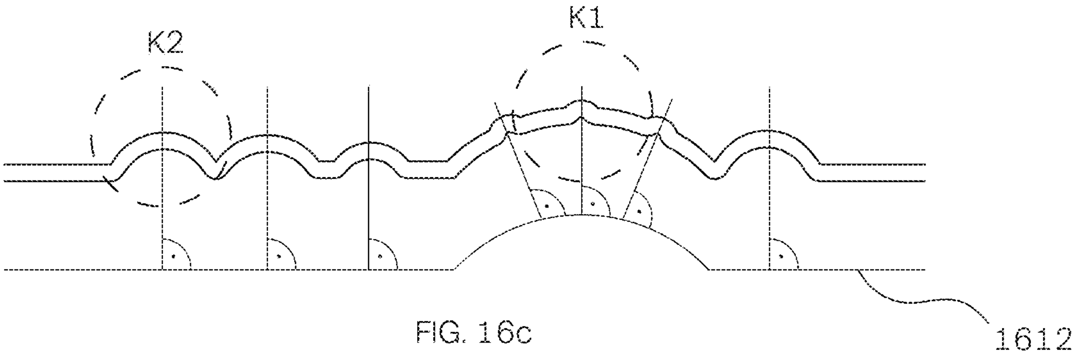

More specifically, FIG. 16*a* shows a roller surface 1610 of a first roller (first roller not represented in FIG. 16*a*) represented as a straight line with a relief topography 1611 provided thereon, which in this example appears as an elevation above the roller surface similar to a hill. It is understood that for the purpose of embossing, the counter roller (second roller) is provided with a complementary relief topography complementary to the relief topography. A 2-dimensional grid is projected on a surface of the relief topography 1611. A plurality of positive projections embodied as conical structured teeth—similar to the ones represented in FIG. 14*a*—wherein each conical structured tooth has a substantially circular base, and in the overall, the conical structured teeth have heights and diameters of their base that may vary from one tooth to another one. More specifically, a center of each circular base is positioned on a regular 2-dimensional grid, and the diameter of the base varies as a function of the height of the conical structured tooth (measured from the surface of the relief topography 1611). In this example, the conical structured teeth are obtained by executing an operation described for cell a) in the table of FIG. 10. More specifically, the upper part of the determined base shape—here the determined base shape is a full conical tooth—is shaped to obtain the designed positive projection, the resulting shape of the upper part, i.e., the designed positive projection having a height reduced by an individual offset Ioff as compared to the individual height h of a determined base shape.

Referring now to FIG. 17, this illustrates further examples of embossing roller surfaces in which a roller is provided with a relief topography, and positive projections are arranged in a 2-dimensional grid projected thereon.

Figure 17A:
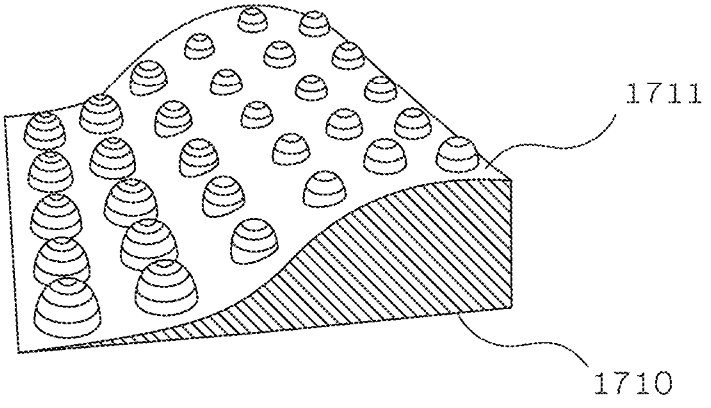
FIGS. 17*a*-17*c* illustrate further examples of embossing roller surfaces in which a roller is provided with a relief topography, and positive projections are arranged in a 2-dimensional grid projected thereon while having been shaped in a specific manner.
Figure 17B:
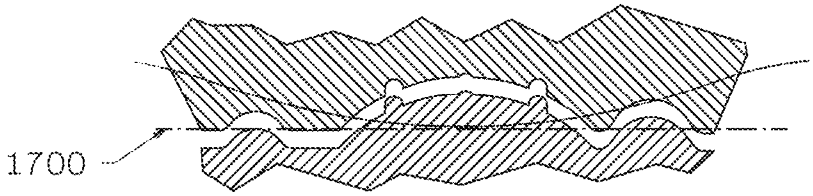
Figure 17C:
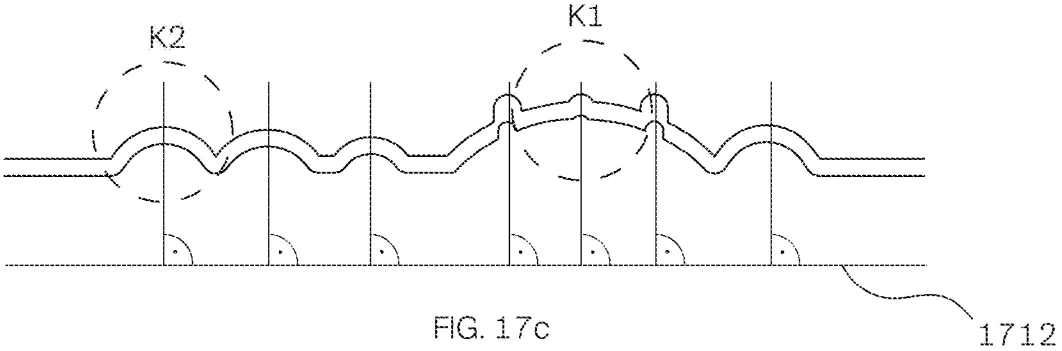

FIG. 17*a* also shows an example a roller surface 1710 of a first roller (first roller not represented in FIG. 16*a*) represented as a straight line with a relief topography 1711 provided thereon, which is this example appears as an elevation above the roller surface similar to a hill. A 2-dimensional grid is projected on a surface of the relief topography 1711. A plurality of positive projections embodied as conical structured teeth—similar to the ones represented in FIG. 14*a*—is arranged according to the 2-dimensional grid similar as in FIG. 16*a*, with the difference that the conical structured teeth are oriented perpendicularly to the roller surface 1710—this is illustrated in FIG. 17*c* by the lines oriented in the axis of the conical structured teeth and perpendicular to the line 1712, which rather than being parallel to the roller surface, is parallel to the rotation axis of the roller, while in FIG. 16*c*, the lines oriented in the axis of the conical structures are shown to be perpendicular to the surface of the roller surface schematically represented by the line 1612.

Continuing the explanation of FIGS. 12-17, FIG. 12*a-c* to FIG. 17*a-c* show complete examples of embossing surfaces according to the invention with

- for FIGS. 12*a*, 13*a*, 14*a*, 15*a*, 16*a* and 17*a* a quasi-three-dimensional view—already explained herein above—,
- for FIGS. 12*b*, 13*b*, 14*b*, 15*b*, 16*b* and 17*b* a cross-sectional view of respective rollers during an embossing process (without material being embossed) indicating respectively a median height 1200, 1300, 1400, 1500, 1600 and 1700 of respective structures on one of the rollers—the cross-sections do not necessarily reflect an arrangement illustrated in the corresponding respective FIGS. 12*a*, 13*a*, 14*a*, 15*a*, 16*a* and 17*a*—, and
- for FIGS. 12*c*, 13*c*, 14*c*, 15*c*, 16*c* and 17*c* resulting embossed foil materials—the embossed foil materials do not necessarily result from an arrangement illustrated in the corresponding respective FIGS. 12*a*, 13*a*, 14*a*, 15*a*, 16*a* and 17*a*, or from the embossing roller pairs illustrated in FIGS. 12*b*, 13*b*, 14*b*, 15*b*, 16*b* and 17*b*.

Drawn circles in FIGS. 12*c*-17*c* mark particularly interesting embossing points K1 and K2. More precisely, K1 shows, e.g., how large-area brilliant stripes of embossed foil material are shaped. K2 shows embossed results of particularly shaded or matted halftone dots in the embossed foil material. While not shown in FIG. 12*a* to FIG. 17*c*, the reflections of light from the embossed foil material may be perceived by the human eye over a wide angle, independently of any side effects related to embossing conditions and hence fulfilling the object of the invention.

Figure 18:
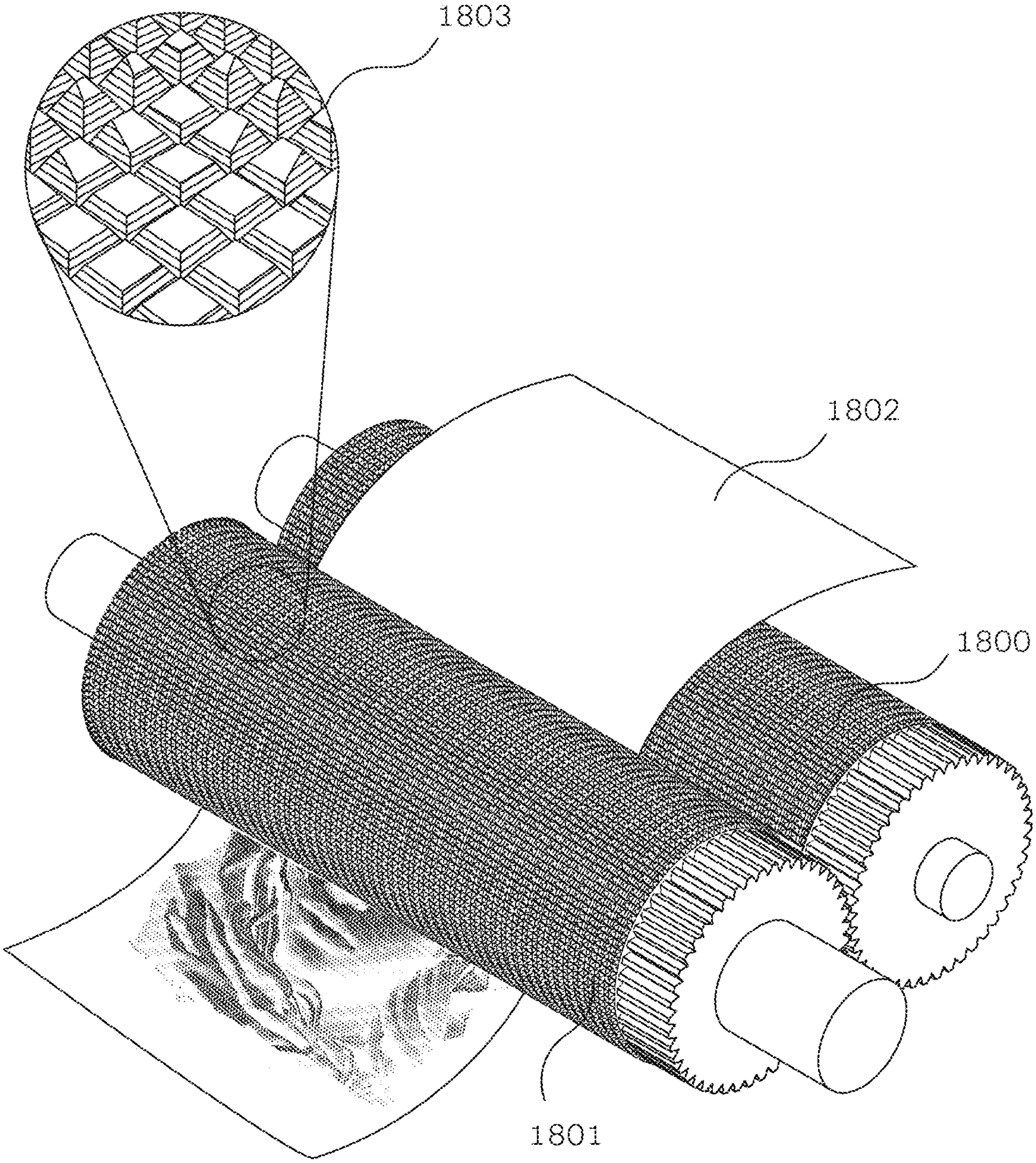
FIG. 18 contains a quasi-three-dimensional representation of a two-roller embossing tool with a foil according to the invention.

FIG. 18 depicts an interaction between two complementary patrix/matrix embossing rollers 1800 and 1801, with an endless web material 1802 (shown as a limited piece in FIG. 18) such as inner-liner foils, polymeric foils, metallic foils or foils used in product packaging applications. The magnified part 1803 shows an example of embossing structures according to the present invention.

Figure 19:
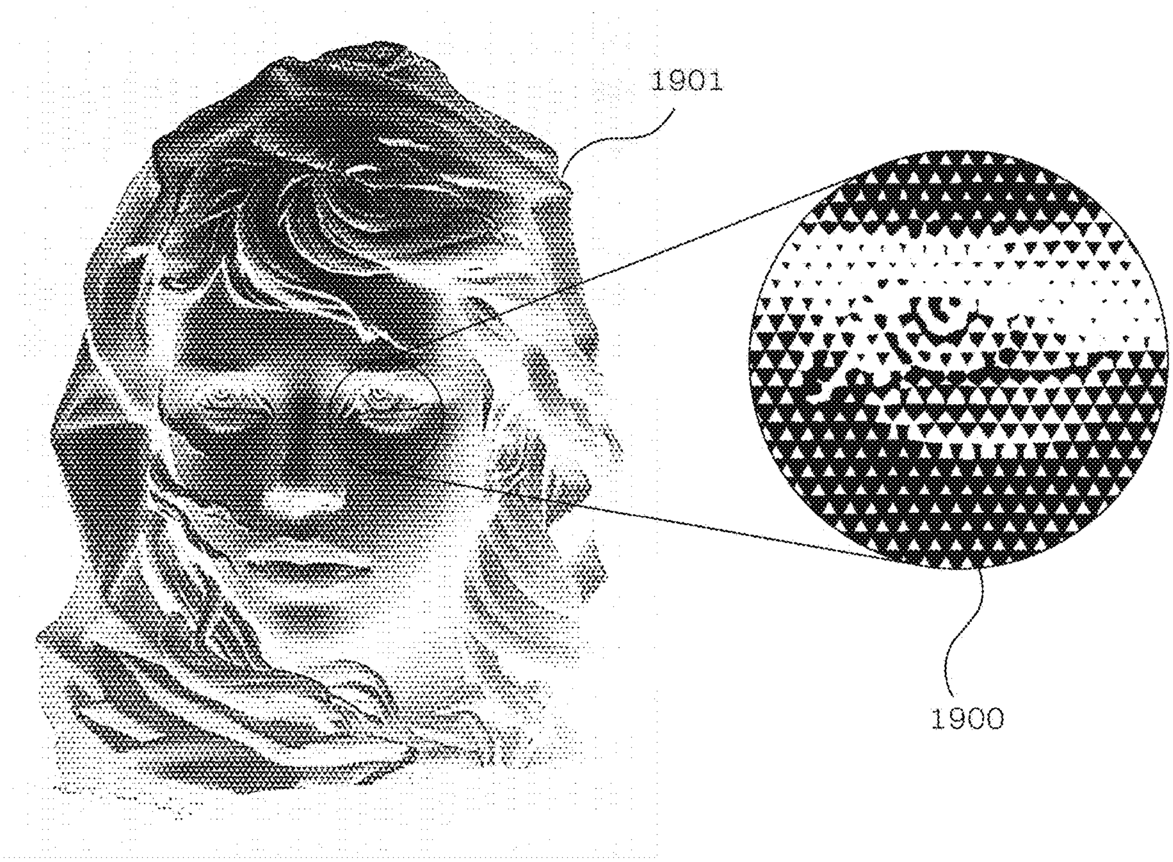
FIG. 19 illustrates an example of embossed image patterns with magnification of structures according to FIG. 18.

FIG. 19 shows a detailed magnification 1900 of an embossing 1901 of a packaging foil—in this example a picture of a face—according to the invention. The detailed magnification clearly shows a modulation of the reflective area, which has been obtained at the time of embossing by embossing structures that have different surfaces corresponding to the intended reflective surfaces in the packaging foil, as illustrated by the amount of surface represented in white in the figure, and hence the halftone value of the underlying graphics template.

The applications as shown in FIG. 20 to FIG. 25 are simple examples of the above-mentioned embossing technology.

Figure 20:
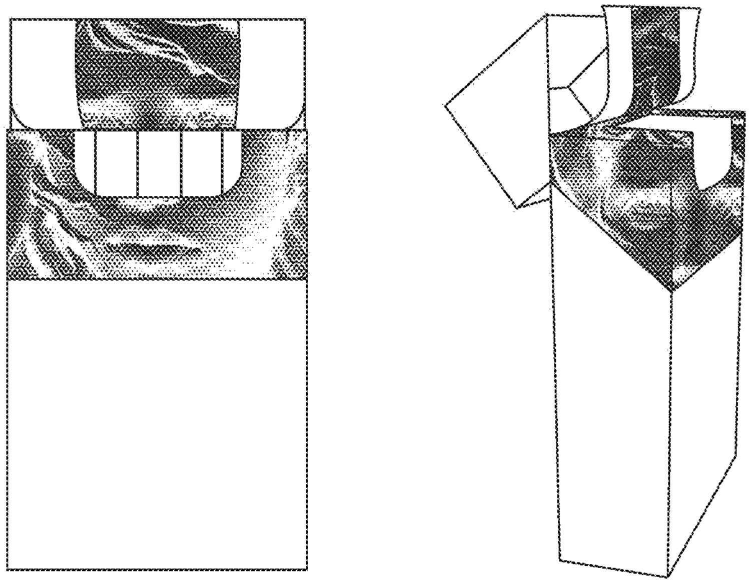
FIG. 20 shows an application example according to the invention, namely a seal pack with decoration for, e.g., smoking articles.

FIG. 20 shows an application example according to the invention, namely a seal pack with decoration for, e.g., smoking articles.

Figure 21:
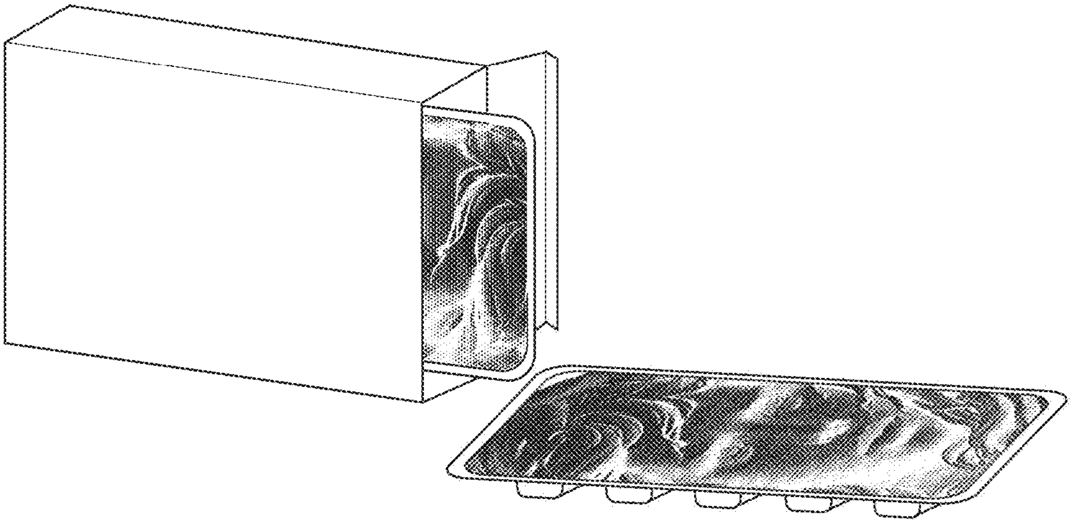
FIG. 21 shows a further application example according to the invention, namely a blister pack with decoration on a cover foil for, e.g., smoking articles or medication.

FIG. 21 shows a further application example according to the invention, namely a blister pack with decoration on a cover foil for, e.g., smoking articles or medication.

Figure 22:
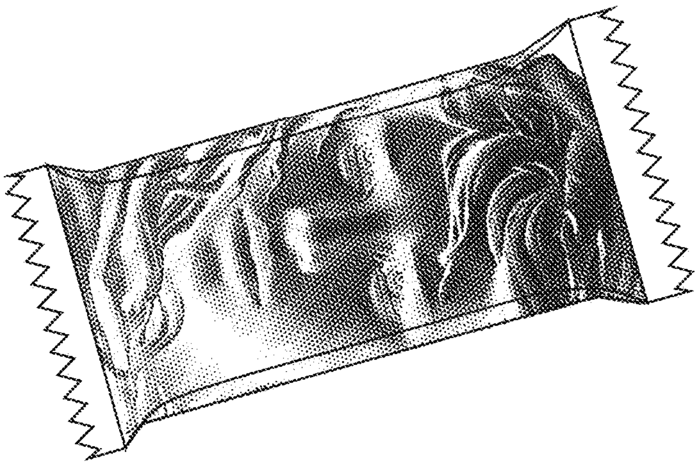
FIG. 22 shows a further application example according to the invention, namely a soft-wrap for sweet goods.

FIG. 22 shows a further application example according to the invention, namely a soft-wrap for sweet goods.

Figure 23:
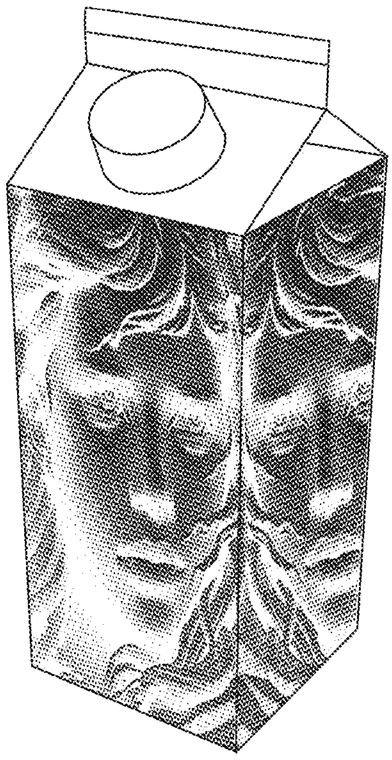
FIG. 23 shows a further application example according to the invention, namely a Tetra Brik (registered trademark) with decoration.

FIG. 23 shows a further application example according to the invention, namely a Tetra Brik (registered trademark) with decoration.

Figure 24:
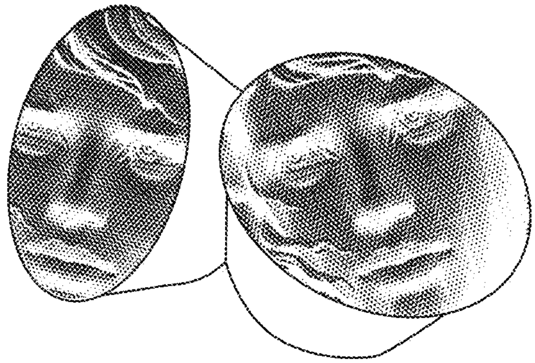
FIG. 24 shows a further application example according to the invention, namely a decoration of cover foil for beverage capsules.

FIG. 24 shows a further application example according to the invention, namely a decoration of cover foil for beverage capsules.

Figure 25:
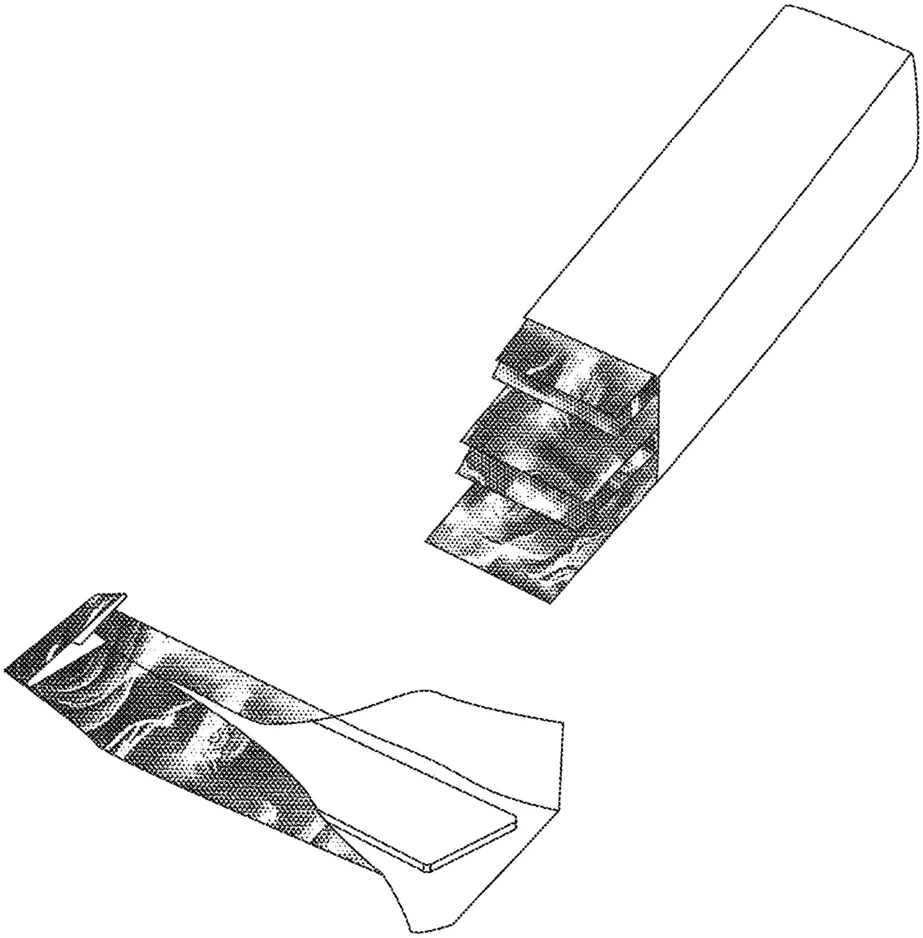
FIG. 25 shows a further application example according to the invention, namely a wrapping-decoration of chewing gum.

FIG. 25 shows a further application example according to the invention, namely a wrapping-decoration of chewing gum.

The invention may find use in decorative embossing of luxury objects, e.g., watches or jewelry, but also in the area of pharmaceuticals, food industry, sweets, snacks, etc.

Since the height of the embossing structures may be kept to a minimum while still getting very strong and weakly viewing-angle dependent shading or dithering effects, the novel embossing method may be applied to implementations where the surface of the embossed material has to be kept nearly flat.

While the invention was described to be used with rollers, and more particularly a pair of rollers, the discussed structures may well be applied to planar embossing tools for planar embossing between a pair of planar embossing tools. This is particularly of interest in case the material to emboss becomes too rigid, and rotary embossing no more provides sufficient force to deform the material during the short time-window of the material passing between the rolls. The person skilled in the art may conclude that the technology of the invention (method and device) may be adapted to the use of embossing material that is more rigid. This could be on conveyor belts that bring the material to the embossing tool, an embossing hammer that is applied during an appropriate interval to the material.

In addition, the rotational manner of embossing according to the invention may also be used when the material is presented by other means to the embossing rollers, e.g., when the material to emboss is planar, un-deformed and stamp embossed.

Figure 26:
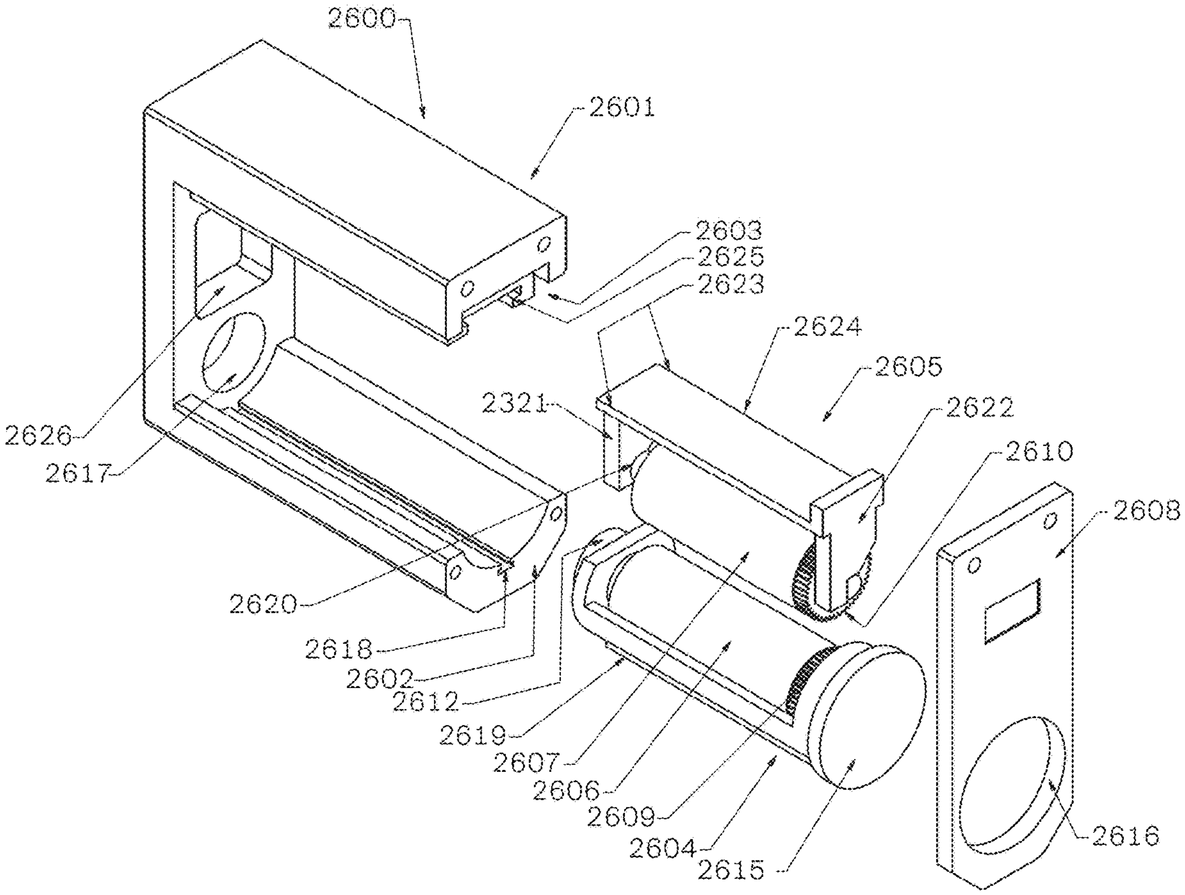
FIG. 26 illustrates a further example embossing system with a quick-change device for rollers in a perspective view.

FIG. 26 illustrates a further example embodiment of an apparatus for embossing foil material on both sides according to the invention (foil material not represented in FIG. 26), in the form of a quick-change device 2600. The quick-change device 2600 includes a housing 2601 with two mountings 2602 and 2603 for receiving a roller carrier 2604 and 2605 each. Roller carrier 2604 serves for fastening the first die roller 2606 which is driven via the drive (not represented in FIG. 26) and roller carrier 2605 serves for fastening the second die roller 2607. The roller 2604 may be pushed into the mounting 2602 and roller carrier 2605 into the mounting 2603. The housing 2601 is closed off with a termination plate 2608.

In the present example, the second die roller is driven by the driven first die roller 2606 in each case via toothed wheels 2609 and 2610, which are located at an end of the rollers. In order to ensure the demanded high precision of synchronization, the toothed wheels are produced very finely. Other synchronization means are also possible, e.g., electric motors.

When pushed into the mountings, a roller axle (not shown in the FIG. 26) of the first die roller 2606 is rotatably held in a needle bearing 2612 in the roller carrier 2604 and on the other side in ball bearing (also not shown in the FIG. 26). The two ends—only one end 2615 is shown in FIG. 26—of the roller carrier 2604 are held in corresponding opening 2616 and 2617 in the housing, or termination plate. For the exact and unambiguous introduction and positioning of the roller carrier into the housing, the housing bottom comprises a T-shaped slot 2618, which corresponds to a T-shaped key 2619 on the roller carrier bottom. The roller axle 2620 of the second die roller 2607 is mounted on one side, in the drawing on the left, in a wall 2621 of the roller carrier 2605 and on the other side in a second wall 2622 of the roller carrier. The edges 2623 of lid 2624 of the roller carrier are embodied as keys which can be pushed into the corresponding T-slot 2625 in the housing 2601. Here, the one sidewall 2621 fits into a corresponding opening 2626 in the housing wall.

In the present description, it is referred often to the first roller and the second roller when describing the pair of rollers that are used to produce the embossed foil material. In the actual embossing system, either one of the first roller and the second roller may be the roller that is driven, this having no impact on the invention.

The invention claimed is:

1. An embossing device configured to emboss light-reflecting areas on a foil material, the embossing device comprising:

a pair of rollers configured to form a roller nip for admission of the foil material, the pair of rollers including a first roller and a second roller, each one of the first roller and second roller having, at their respective surfaces in a perimeter, a plurality of polyhedron-shaped positive projections and a plurality of negative projections complementary to the polyhedron-shaped positive projections, wherein the plurality of positive projections are arranged according to a two-dimensional grid, each one of the plurality of positive projections extending over an individual height from a base side of the positive projection at a surface of the first roller to a top side of the positive projection in a direction away from a rotation axis of the first roller, each of the negative projections extending from a surface of the second roller to a bottom side of the negative projection in a direction towards the rotation axis of the second roller, wherein the plurality of polyhedron-shaped positive projections are configured to join with the corresponding negative projections at an area of embossing of the foil material to enable a homogeneously jointed embossed polyhedron-like shape in the foil, wherein the plurality of positive projections and the plurality of negative projections are configured to emboss the light-reflecting areas on the foil material in accordance with a table of reflectivity values for the two-dimensional grid, according to an orientation and shape of each of the light-reflecting areas for which an orientation and a shape of a corresponding positive projection is adjusted, and wherein at least one positive projection of the plurality of polyhedron-shaped positive projections comprises a height and/or tilting angle with respect to a planar surface tangent to the surface of the first roller at the center of the base area of the positive projection, which differs from the height and/or tilting angle of at least one of the other positive projections of the plurality of polyhedron-shaped positive projections, and the plurality of negative projections complementary in depth and/or tilting angle to the plurality of positive projections.

2. The device of claim 1, wherein each one of the plurality of the positive projections of the two-dimensional grid has a shape that is described by a base shape which has a base surface delimited by a base perimeter to be positioned on the surface of the first roller and a three-dimensional shape described by a three-dimensional shape-contour function, wherein for at least some of the positive projections, the shape is obtained by cutting-off a top of the base shape along an individual intersection of the base shape with an individual shape to obtain an individual form of the top side of the base shape, that is used to emboss a light-reflective area configured to have a reflectivity according to the table of reflectivity values for the two-dimensional grid, the remaining part of the base shape being the designed positive projection to be positioned at the surface of the first roller.

3. The device of claim 1, wherein each one of the plurality of the positive projections of the two-dimensional grid has a shape that is described by a base shape which has a base surface delimited by a base perimeter configured to be positioned on the surface of the first roller and a three-dimensional shape described by a three-dimensional shape-contour function, wherein for at least some of the positive projections, the shape is obtained by applying an individual three-dimensional gain-factor function to the base shape to obtain the designed positive projection, that is used to emboss a light-reflective area configured to have a reflectivity according to the table of reflectivity values for the two-dimensional grid, the individual three-dimensional gain-factor function being configured to be applied to the three-dimensional shape-contour function thereby such that the designed positive projection has the same base perimeter as the base shape, the designed positive projection has no part that overlaps beyond the base perimeter, and any point in the contour of the designed positive projection is free from overlap with another point of the contour maintaining a base surface of the base shape configured to be positioned at the surface of the first roller and, resulting in an overall deformation of the base shape in proportion to the individual gain factor.

4. The device of claim 1, wherein each one of the plurality of the positive projections of the two-dimensional grid has a shape that is described by departing from a base shape which has a base surface delimited by a base perimeter configured to be positioned on the surface of the first roller and a three-dimensional shape described by a three-dimensional shape-contour function, wherein for at least some of the positive projections, the shape is obtained by applying an individual three-dimensional offset function to the base shape to obtain the designed positive projection, that is used to emboss a light-reflective area configured to have a reflectivity according to the table of reflectivity values for the two-dimensional grid, the individual three-dimensional offset function being configured to be applied to the three-dimensional shape-contour function such that each value of the three-dimensional shape-contour function is changed from a respective individual height to a corresponding modified height, resulting in an overall deformation of the base shape in relation to the three-dimensional individual offset function.

5. The device of claim 1, wherein the two-dimensional grid includes a tessellation of grid surfaces, each grid surface comprising a grid surface perimeter with a plurality of corners, wherein single ones of the plurality of positive projections are positioned at corresponding corners, each corner comprising at most a single positive projection.

6. The device of claim 1, wherein the two-dimensional grid comprises a tessellation of grid surfaces, each grid surface comprising a grid surface perimeter with a plurality of corners, wherein single ones of the plurality of positive projections are positioned in corresponding individual grid surfaces, each individual grid surface comprising at most a single positive projection.

7. The device of claim 1, wherein the two-dimensional grid is an unstructured grid.

8. The device of claim 1, wherein the two-dimensional grid is a regular grid.

9. The device of claim 8, wherein the two-dimensional regular grid includes one of a Cartesian grid, a rectilinear grid, or a curvilinear grid.

10. The device of claim 8, wherein the two-dimensional grid comprises:

a plurality of rows and columns, the tessellation of grid surfaces organized in the plurality of rows and columns, wherein single ones of the plurality of positive projections are positioned in corresponding individual grid surfaces in rows, the positive projections being spaced among each other according to a value of a first step function that describes a distance between grid surfaces in a direction of the row, wherein adjacent rows of positive projections are separated by a value of a second step function that describes a distance between grid surfaces in a direction of the column.

11. The device of claim 10, wherein in each of the rows of positive projections, between two consecutive positive projections, a second negative projection is provided on the first roller, such that a plurality of second negative projections becomes arranged in the same row as the positive projections, the second negative projections of the row being regularly spaced among each other according to the value of the first step function, and wherein adjacent rows of second negative projections are separated by the value of the second step function, wherein each second negative projection extends from the surface of the first roller to a bottom side of the second negative projection in a direction towards the rotation axis of the first roller, further including, from one row to an adjacent row, providing next to a positive projection from the one row in the adjacent alignment a further second negative projection distant from the positive projection in column direction, wherein two consecutive second negative projections in a same column are separated by the value of the second function, the device further comprising:

a plurality of second positive projections complementary to the second negative projections on the second roller, and the plurality of second negative projections joining with corresponding second positive projections at the light reflective areas of the foil material.

12. The device of claim 1, further comprising on the first roller at least on the surface in the perimeter, a relief topography comprising at least one of an elevation or a depression of the surface, on the second roller a complementary relief topography complementary to the relief topography, wherein the two-dimensional grid is projected onto the relief topography.

13. The device of claim 1, wherein each of the first roller and second roller includes, at their respective surface, positive and negative projections in surfaces of a plurality of perimeters, and the two-dimensional grid is different for each of at least two surfaces of distinct perimeters, each of the two-dimensional grids being associated to its own table of reflectivity values.

14. The device of claim 1, wherein the individual height is less or equal to 500 μm.

15. The device of claim 1, wherein the foil material includes at least one of packaging material, packaging films, metallic foils, metallized papers, polymer films, and laminates.

16. The device according to claim 1, further comprising:

a quick-change device configured to operate the pair of rollers, the quick-change device including a housing with a first and a second mounting for receiving a first roller carrier and a second roller carrier, respectively, the first roller carrier configured to fasten the first or the second roller which is driven via a drive and the second roller carrier configured to fasten the second or the first roller, respectively, the quick-change device configured to enable a pushing of the first roller carrier into the first mounting and the second roller carrier into the second mounting.

17. A method of embossing individually light-reflecting areas on a foil material by a pair of rollers including a first roller and a second roller, the first roller and second roller having, at respective surfaces at least in a perimeter, a plurality of polyhedron-shaped positive projections and a plurality of negative projections complementary to the positive projections, the perimeter having at least one positive projection, the plurality of positive projections are arranged according to a two-dimensional grid, each one of the plurality of positive projections extending over an individual height from a base side of the positive projection at the surface of the first roller to a top side of the positive projection in a direction away from a rotation axis of the first roller, and each negative projection extending from the surface of the second roller to a bottom side of the negative projection in a direction towards the rotation axis of the second roller, the plurality of polyhedron-shaped positive projections joining with corresponding negative projections at an embossing location of the foil material, enabling a homogeneously jointed embossed polyhedron-like shape in the foil, the method comprising:

feeding a foil material into a roller nip between the pair of rollers;

adjusting an orientation and a shape of each of the positive projections, in the two-dimensional grid; and embossing the foil material to provide a plurality of light-reflecting areas on the foil material, the light reflecting areas configured to reflect light in line with a table of reflectivity values for the two-dimensional grid, according to an orientation and shape of each of the plurality of light-reflecting areas for which the orientation and the shape of a corresponding positive projection is adjusted, to thereby enable a perception of the reflected light on a wide viewing angle covered by reflected light from the light-reflecting areas, wherein at least one positive projection of the plurality of polyhedron-shaped positive projections comprises a height and/or tilting angle with respect to a planar surface tangent to the surface of the first roller at the center of the base area of the positive projection, which differs from the height and/or tilting angle of at least one of the other positive projections of the plurality of polyhedron-shaped positive projections, and the plurality of negative projections complementary in depth and/or tilting angle to the plurality of positive projections.

* * * * *